United States Patent
Kelley et al.

(10) Patent No.: US 9,068,858 B2
(45) Date of Patent: Jun. 30, 2015

(54) GENERIC AND SECURE AMI END DEVICE CONFIGURATION

(75) Inventors: Raymond H. Kelley, Raleigh, NC (US); Sean M. Scoggins, Rolesville, NC (US); Robert T. Mason, Jr., Raleigh, NC (US); Donato Colonna, Raleigh, NC (US); Richard Rogers, Raleigh, NC (US)

(73) Assignee: Elster Solutions, LLC, Raleigh, NC (US)

(*) Notice: Subject to any disclaimer, the term of this patent is extended or adjusted under 35 U.S.C. 154(b) by 0 days.

(21) Appl. No.: 13/446,569

(22) Filed: Apr. 13, 2012

(65) Prior Publication Data

US 2013/0275736 A1 Oct. 17, 2013

(51) Int. Cl.
 *G01D 4/00* (2006.01)
 *G06Q 50/06* (2012.01)
 *G06Q 30/04* (2012.01)

(52) U.S. Cl.
 CPC ........... *G01D 4/004* (2013.01); *G06Q 50/06* (2013.01); *G06Q 30/04* (2013.01); *Y02B 90/242* (2013.01); *Y02B 90/246* (2013.01); *Y04S 20/322* (2013.01); *Y04S 20/42* (2013.01)

(58) Field of Classification Search
 CPC ....... G06Q 30/04; G06Q 50/06; G01D 4/004; G06F 8/60; G06F 8/65; G06F 8/70; G06F 21/60; G06F 21/602; G06F 2221/2107
 USPC ...................... 713/189, 1, 100, 190; 725/152; 717/168, 172, 173; 340/870.01, 870.02
 See application file for complete search history.

(56) References Cited

U.S. PATENT DOCUMENTS

| | | | |
|---|---|---|---|
| 5,923,269 A | 7/1999 | Shuey et al. | |
| 6,032,203 A | 2/2000 | Heidhues | |
| 6,061,725 A | 5/2000 | Schwaller et al. | |
| 6,226,788 B1 | 5/2001 | Schoening et al. | |
| 6,393,341 B1 | 5/2002 | Lawrence et al. | |
| 6,408,335 B1 | 6/2002 | Schwaller et al. | |
| 6,560,720 B1 | 5/2003 | Chirashnya et al. | |

(Continued)

FOREIGN PATENT DOCUMENTS

| | | |
|---|---|---|
| CN | 101615357 | 12/2009 |
| WO | WO 03/027840 A1 | 4/2003 |

OTHER PUBLICATIONS

Metke, Anthony R., and Randy L. Ekl. "Security technology for smart grid networks." Smart Grid, IEEE Transactions on 1.1 (2010): 99-107.*

(Continued)

*Primary Examiner* — Andrew W Johns
(74) *Attorney, Agent, or Firm* — Baker & Hostetler LLP

(57) ABSTRACT

A metering device may be configured to communicate with other devices on a plurality of metering communication networks, such as an advanced metering infrastructure (AMI) network. For example, a metering end device may be programmed or reconfigured via an AMI network. A metering end device may receive, via the AMI network, a program recipe comprising one or more configuration parameters. The program recipe may be specific to the end device and formatted according to a generic program table of the end device. The end device may decrypt and validate the program recipe. The end device may implement the decrypted program recipe to configure the end device with the one or more configuration parameters.

19 Claims, 20 Drawing Sheets

(56) References Cited

U.S. PATENT DOCUMENTS

| | | |
|---|---|---|
| 6,954,814 B1 | 10/2005 | Leach |
| 6,988,182 B2 | 1/2006 | Teachman et al. |
| 7,165,189 B1 | 1/2007 | Lakkapragada et al. |
| 7,447,760 B2 | 11/2008 | Forth et al. |
| 7,606,165 B2 | 10/2009 | Qiu et al. |
| 7,673,337 B1 | 3/2010 | Osburn, III et al. |
| 7,704,147 B2 | 4/2010 | Quraishi et al. |
| 7,994,934 B2 | 8/2011 | Kagan |
| 8,010,640 B2 | 8/2011 | Aune et al. |
| 8,024,724 B2 | 9/2011 | Garrison Stuber et al. |
| 2007/0169107 A1 | 7/2007 | Huttunen |
| 2008/0042871 A1 | 2/2008 | Donaghey et al. |
| 2009/0138866 A1 | 5/2009 | Veillette et al. |
| 2009/0228697 A1* | 9/2009 | Kurashige ............ 713/100 |
| 2012/0124367 A1 | 5/2012 | Ota et al. ............ 713/153 |
| 2012/0179957 A1* | 7/2012 | Jhang et al. .......... 715/227 |

OTHER PUBLICATIONS

The OPEN Meter Consortium: Communication profile: IP for the Meters and More suite. Version: 1.0. Project Funded by the European Commission under the 7th Framework Programme. Jun. 2011, pp. 1-17.*

CGI Brochure, PragmaLINE Outage Management Solution, 2009, CGI Group Inc., pp. 1-2, www.CGI.com.

Mattoli et al, "A universal Intelligent system-on-Chip Based Sensor Interface", Sensors, 2010, 10, 7716-7747.

Oracle Utilities Data Sheet, "Building a Smart Grid with Oracle Utilities Network Management System", 2011, www.oracle.com/goto/utilities, pp. 1-6.

Smallworld PowerON Network Solutions, GE Network Solutions, 2002 GE Smallworld, a limited partnership registered in England and Wales d/b/a GE Network Solutions., pp. 1-4, www.gepower.com/networksolutions.

The Meter Haus Brochure, The Meter Haus, LLC, Mar. 2009, pp. 1-2, info@themeterhaus.com.

The OPEN Meter Consortium, State-of-the-art Technologies & Protocols, Project Funded by the European Commission under the 7th Framework Programme, Jun. 2009, pp. 1-72.

UMI (Universal Metering Interface),, Overview, Cambridge Consultants Ltd., Oct. 3, 2011, http://www.cambridgeconsultants.com/downloads/literature/UMI_overview.pdf.

UR Family (Universal Relay Family IEDs), GE Multilin, 2002, wvvw.GEindustrial.com/Multilin, pp. 1-16.

* cited by examiner outbound packet

| Length | SrcAddr | DestAddr | RptPath | Data (payload) |

Figure 3C inbound packet

| Length | SrcAddr | DestAddr | RptAddr | Data (payload) |

Figure 3D

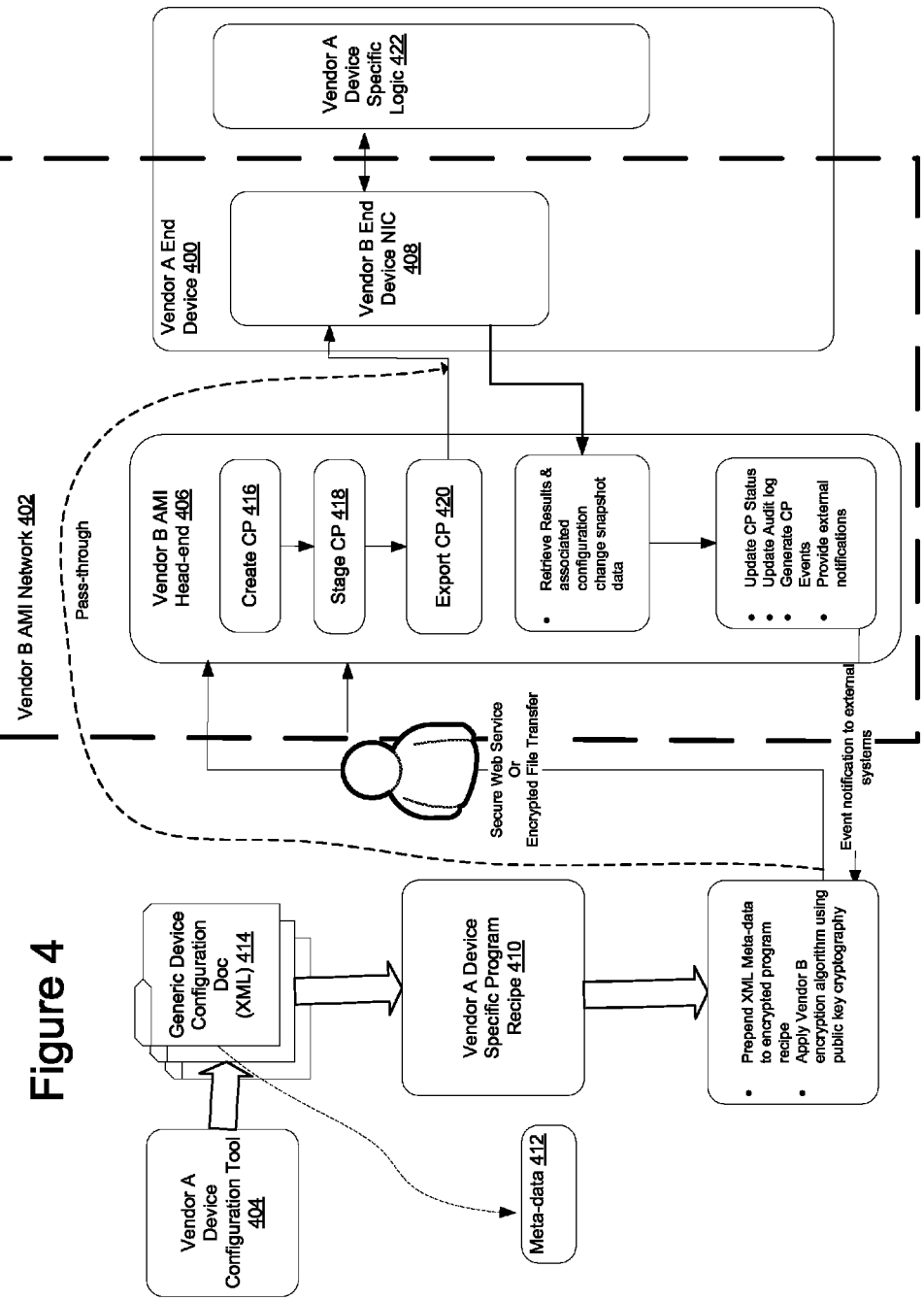

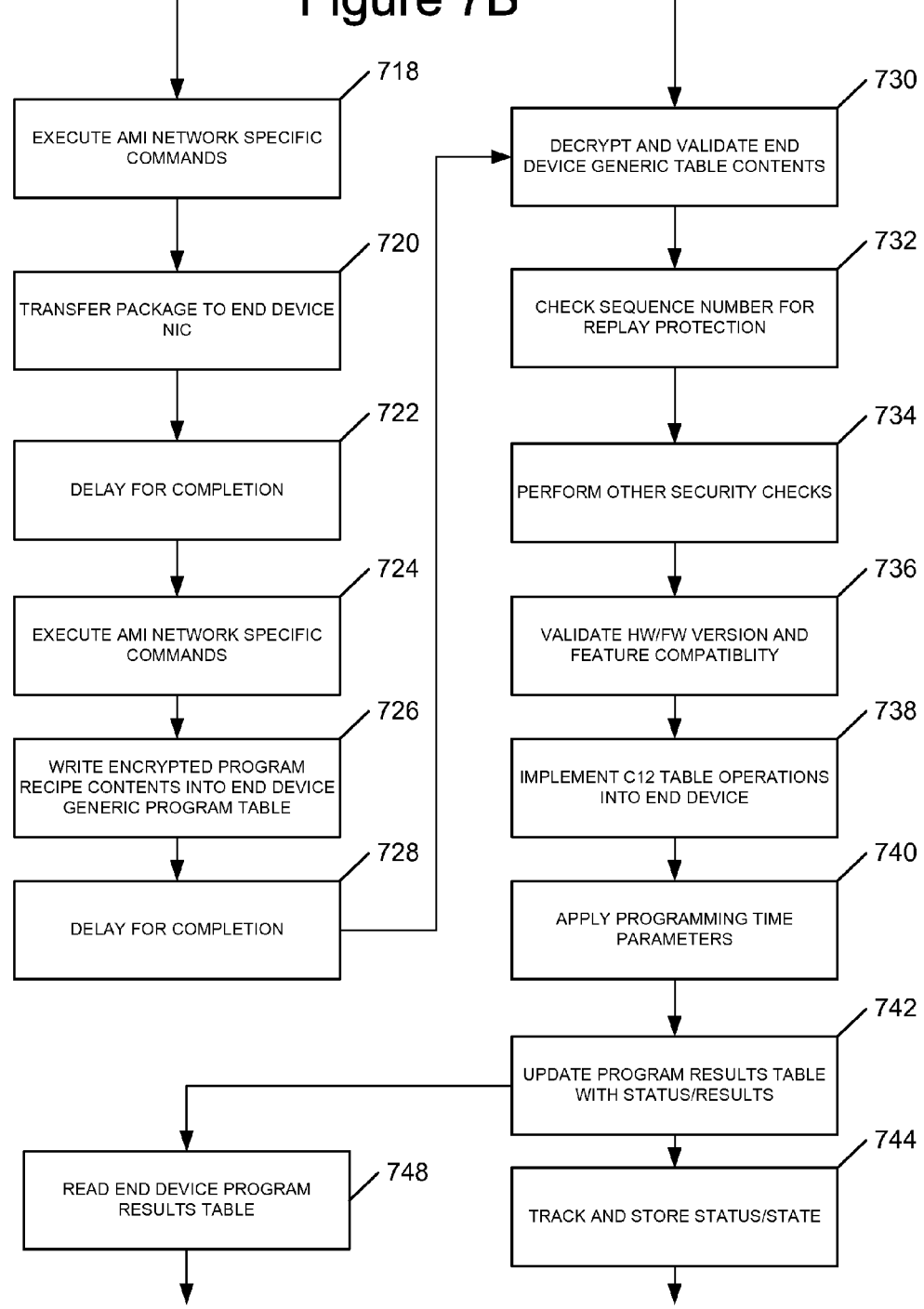

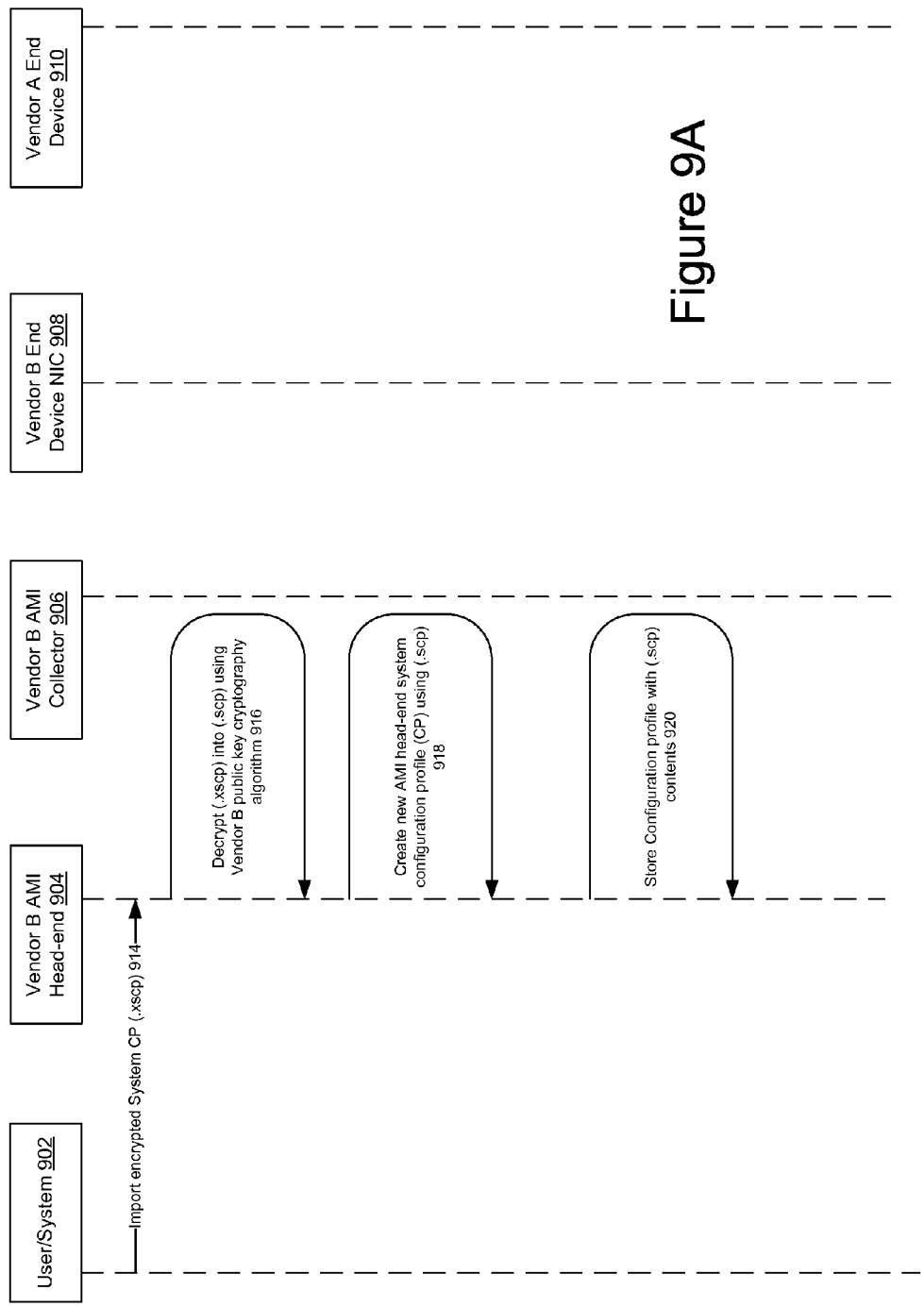

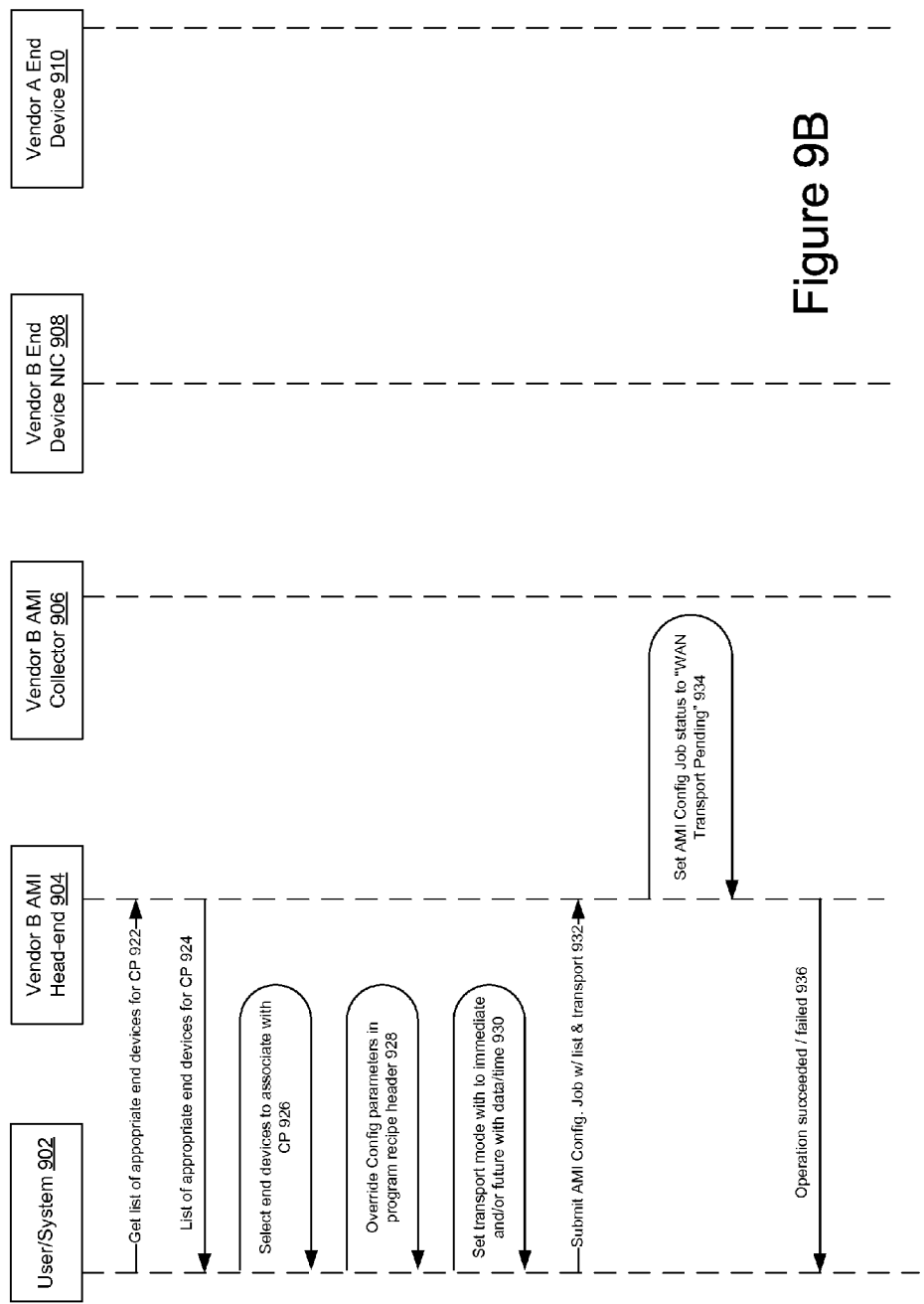

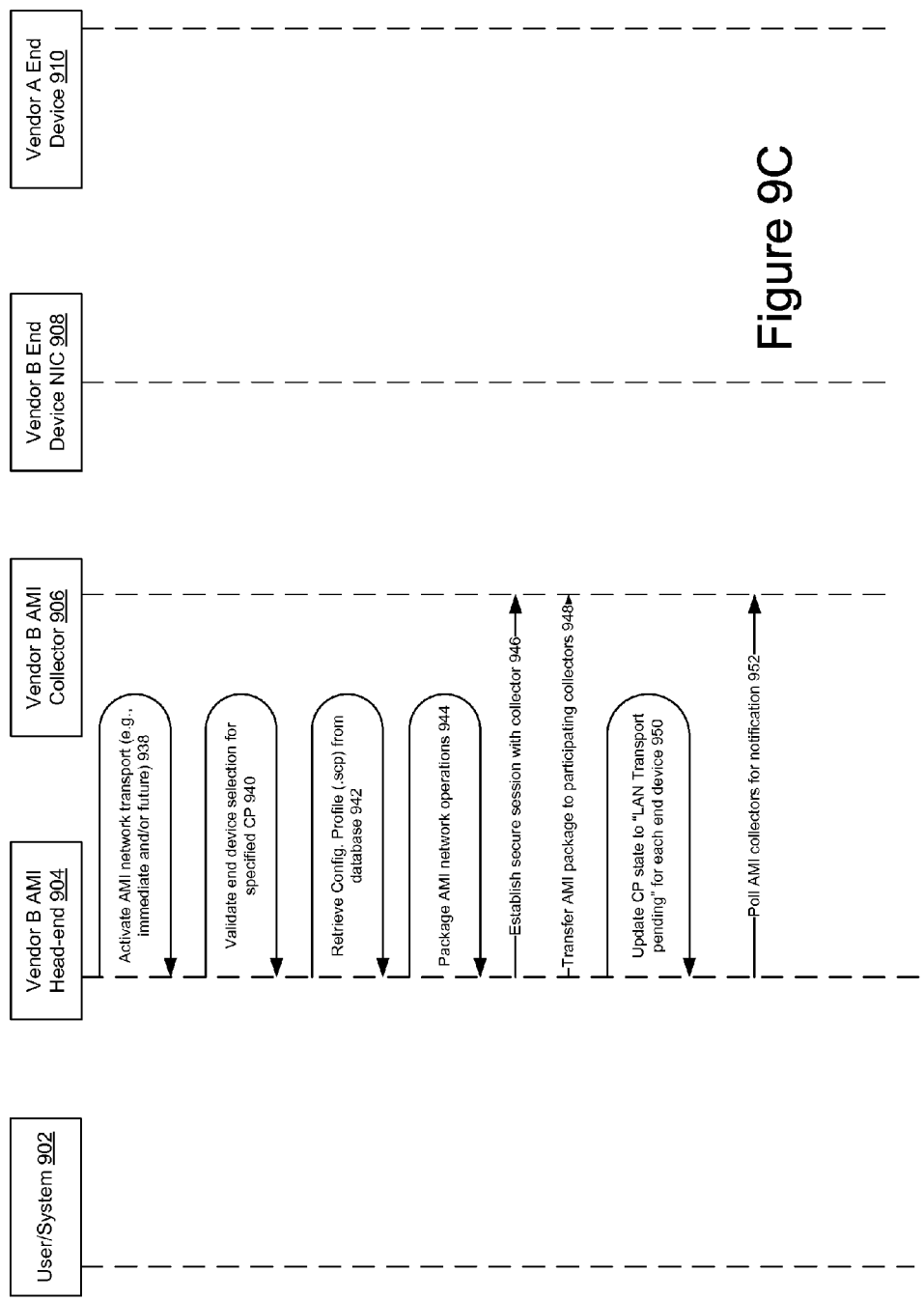

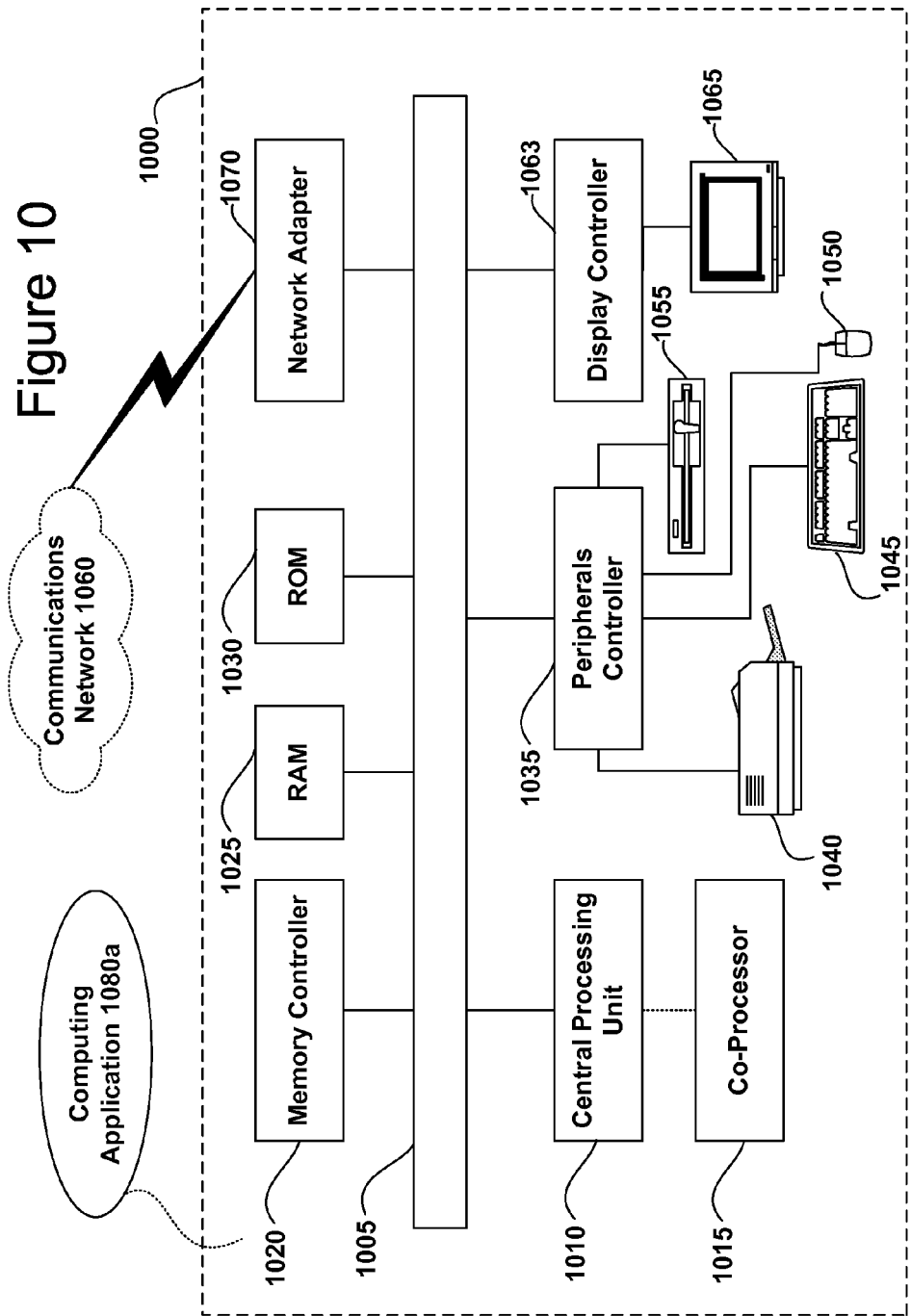

GENERIC AND SECURE AMI END DEVICE CONFIGURATION

BACKGROUND

Utilities may use communication systems to read data from electricity, water, and/or gas meters. These communication systems and meters may be installed at customer locations and used to measure consumption and other parameters to determine a customer's monthly bill. Communication systems and smart meters, for example, may communicate in advanced metering infrastructure (AMI) networks.

AMI networks increasingly communicate with end devices, such as metering devices, which are manufactured by multiple vendors. Similarly, end devices increasingly communicate with different AMI networks with varying communication topologies and different communication protocols. Additionally, some end devices may be programmed or reconfigured remotely. Generally, each end device manufacturer has developed specific programming tools to reconfigure its own devices. For example, a manufacturer's reconfiguration or programming process may involve any number of operations that are executed in a specific sequence.

Existing approaches to reconfiguring end devices via AMI networks lack efficiency and stability. For example, an existing approach reconfigures an end device through a network one step at a time, resulting in a partially reconfigured end device if network communications interrupt the programming sequence. When a communication failure occurs during reconfiguration, for example, the end device may be left in an inoperable state or left in an operable state with a partial configuration. Another existing approach to remote end device reconfiguration through an AMI system is to utilize device "pending tables". In this approach, each configurable component in an end-device may have a pending table to hold the new configuration until all reconfiguration or programming is complete. As the number of devices and device types increases and varies, for example, managing accurate pending tables (e.g., by an AMI head-end device) for various devices becomes increasingly complex and inefficient.

Existing approaches also present security issues. For example, some existing approaches expose sensitive end device programming information to an AMI system.

SUMMARY OF THE INVENTION

Various techniques for programming an end device are disclosed herein, including a method of configuring an end device via an advance metering infrastructure (AMI) network with one or more configuration parameters. Systems and apparatuses for carrying out these methods are also disclosed.

In one embodiment, a metering end device may receive, via an AMI network, a program recipe comprising one or more configuration parameters. As used herein and in the claims, the term "program recipe" refers to a set of programming operations and/or configuration data for programming or configuring an end device associated with (e.g., manufactured by) a particular end device vendor, which in some embodiments may comprise an ordered sequence of programming operations and/or configuration parameters. The program recipe may be formatted according to a generic program table of the end device. After the program recipe is received, the end device may decrypt and validate the program recipe. The end device may implement the program recipe to configure the end device with the one or more configuration parameters. In an embodiment, the AMI network is associated with a vendor that may be different from the vendor that is associated with the end device. For example, the end device may have been manufactured by a vendor that is different from the vendor that developed the AMI network. The data structures and functions (e.g., configuration parameters) for programming the end device may be abstracted from the AMI network without exposing the configuration parameters to an AMI head-end.

An exemplary embodiment of an end device may comprise a transceiver configured to receive, via an AMI network, a program recipe comprising one or more configuration parameters. The program recipe may be specific to the end device and may be formatted according to a generic program table of the end device. The metering end device may further comprise a processor and a memory. The processor may be in electrical communication with the transceiver and the memory. The memory may be configured to store the generic program table comprising one or more encrypted components of the program recipe. The processor may be configured to decrypt the program recipe, validate the program recipe, and implement the program recipe. Implementing the program recipe may configure the end device with the one or more configuration parameters. In an embodiment, the end device is manufactured by a first vendor and the AMI network may be developed by a second vendor that is different than the first vendor.

In one embodiment, a configuration tool may create a system configuration profile. The system configuration profile may comprise meta-data and a program recipe for programming an end device via an AMI network. An AMI head-end system in the AMI network may receive the system configuration profile. In an embodiment, the configuration tool may be an application running on the AMI head-end system. The AMI head-end system may decrypt the meta-data without accessing the program recipe. Based on the meta-data, the AMI head-end system may determine whether the end device is compatible with the system configuration profile. The program recipe may comprise a program recipe header. The AMI head-system may access and change at least one site specific parameter or programming time parameter in the program recipe header. In an embodiment, the end device and configuration tool are associated with a first vendor and the AMI network is associated with a second vendor that is different than the first vendor, and the program recipe can be decrypted by the end device but it is not able to be decrypted by the AMI network.

In accordance with the systems, methods and devices described herein, atomic delivery of a program recipe via an AMI network to an end device may improve reliability. Additionally, an end device may abstract data specific to the end device via an AMI network. For example, the techniques disclosed herein may allow encryption of a program recipe between a configuration tool and an end device, and may allow encryption of meta-data between the configuration tool and an AMI head-end. Additionally, the techniques disclosed herein may allow secure and efficient communications. For example, a program recipe may be validated, authenticated, and/or protected against replay attacks throughout AMI networks. Various program recipes may be produced and implemented without changing the firmware of an end device. Also, approaches to programming WAN connected-end devices and LAN-connected end devices may be unified.

Other features of the systems, methods and devices described herein will become apparent from the following more detailed description and accompanying drawings.

BRIEF DESCRIPTION OF THE DRAWINGS

FIG. 3C illustrates one embodiment of an outbound data packet format of the metering communication system illustrated in FIGS. 1, 2, 3A and 3B, and FIG. 3D illustrates one embodiment of an inbound data packet format;

FIG. 4 is a block diagram illustrating the remote programming of an end device in accordance with one embodiment;

FIGS. 7A, 7B, and 7C comprise a flow diagram providing additional details of the method of remote programming illustrated in FIG. 6;

FIGS. 9A, 9B, 9C, 9D, and 9E comprise an example sequence diagram illustrating further details of a method of programming a fixed network AMI end device via an AMI network in accordance with an embodiment; and FIG. 10 is a block diagram of an exemplary computing system in accordance with one embodiment.

DETAILED DESCRIPTION

Figure 1:
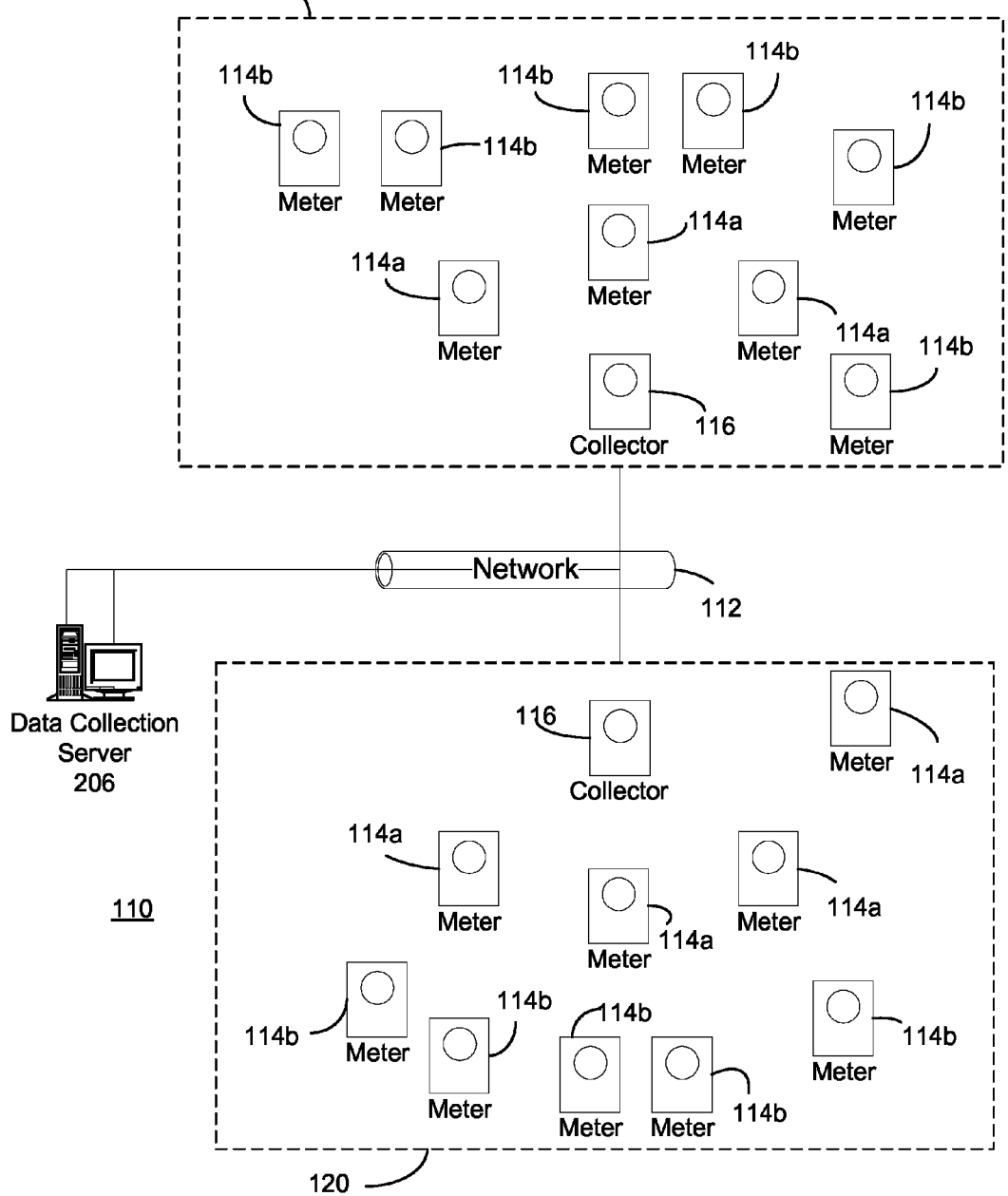
FIG. 1 is a diagram of an exemplary metering communication system employing wireless networking.

Exemplary embodiments of systems, methods and apparatus for programming metering end devices via an advance metering infrastructure (AMI) network are provided herein. The invention is not limited to the specific embodiments described herein. While certain details have been provided to illustrate the embodiments described herein, the invention may be practiced without those specific details. Acronyms and other terms may be used in the following description, however they are not intended to limit the scope of the invention as defined by the appended claims.

The systems, methods and apparatus described herein enable end devices in an AMI network to be remotely programmed. In one embodiment, a utility may change configuration parameters in one or more of its end devices using a program recipe. The program recipe may be received by an end device from an AMI network head-end via an AMI network.

One example of a metering communication system 110 in which the systems, methods, and apparatus described herein may be employed is illustrated in FIGS. 1, 2, and 3A-D. The metering communication system 110 may be referred to as an advanced metering infrastructure (AMI) system. The description given herein with respect to those figures is for exemplary purposes only and is not intended in any way to limit the scope of potential embodiments.

System 110 (AMI) comprises a plurality of end devices, in this case metering communication devices, or "meters" 114, which may be operable to sense and record consumption or usage of a service or commodity such as, for example, electricity, water, and/or gas. Meters 114 may be located at customer premises such as, for example, a home or place of business. Meters 114 may comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly. Meters that are operable to both receive and transmit data may be referred to as "bi-directional" or "two-way" meters (or nodes), while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Solutions, LLC and marketed under the trade name REX.

System 110 further comprises collectors 116. In one embodiment, collectors 116 are also meters operable to detect and record usage of a service or commodity such as, for example, electricity, water, and/or gas. In addition, collectors 116 may be operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 may communicate with and amongst one another using any one of several wireless techniques such as, for example, frequency hopping spread spectrum (FHSS) and/or direct sequence spread spectrum (DSSS). Collectors 116 are also sometimes referred to as "gatekeepers."

A collector 116 and the meters 114 with which it communicates may define a subnet or local area network (LAN) 120 of system 110. In one embodiment, each subnet or LAN may define a controlled, wireless mesh network with the collector 116 (gatekeeper) of that LAN effectively controlling the mesh network. Further details of how such a LAN is initialized, defined and maintained are described hereinafter.

As used herein, a collector 116 and the meters 114 with which it communicates may be referred to as "nodes" in the subnet/LAN 120. In each subnet/LAN 120, each meter transmits data related to consumption of the commodity being metered at the meter's location. The collector 116 may receive the data transmitted by each meter 114, effectively "collecting" it, and then periodically transmit the data from the meters in the subnet/LAN 120 to a data collection server 206. The data collection server 206 stores the data for analysis and preparation of bills, for example. The data collection server 206 may be a specially programmed general purpose computing system, such as an AMI head-end device for example, and may communicate with collectors 116 via a network 112. The network 112 may comprise any form of network, including a wireless network or a fixed-wire network, such as a local area network (LAN), a wide area network (WAN), the Internet, an intranet, an AMI network, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, a TCP/IP network, a W-WAN, a GPRS network, a CDMA network, a Fiber network, or any combination of the above.

Figure 2:
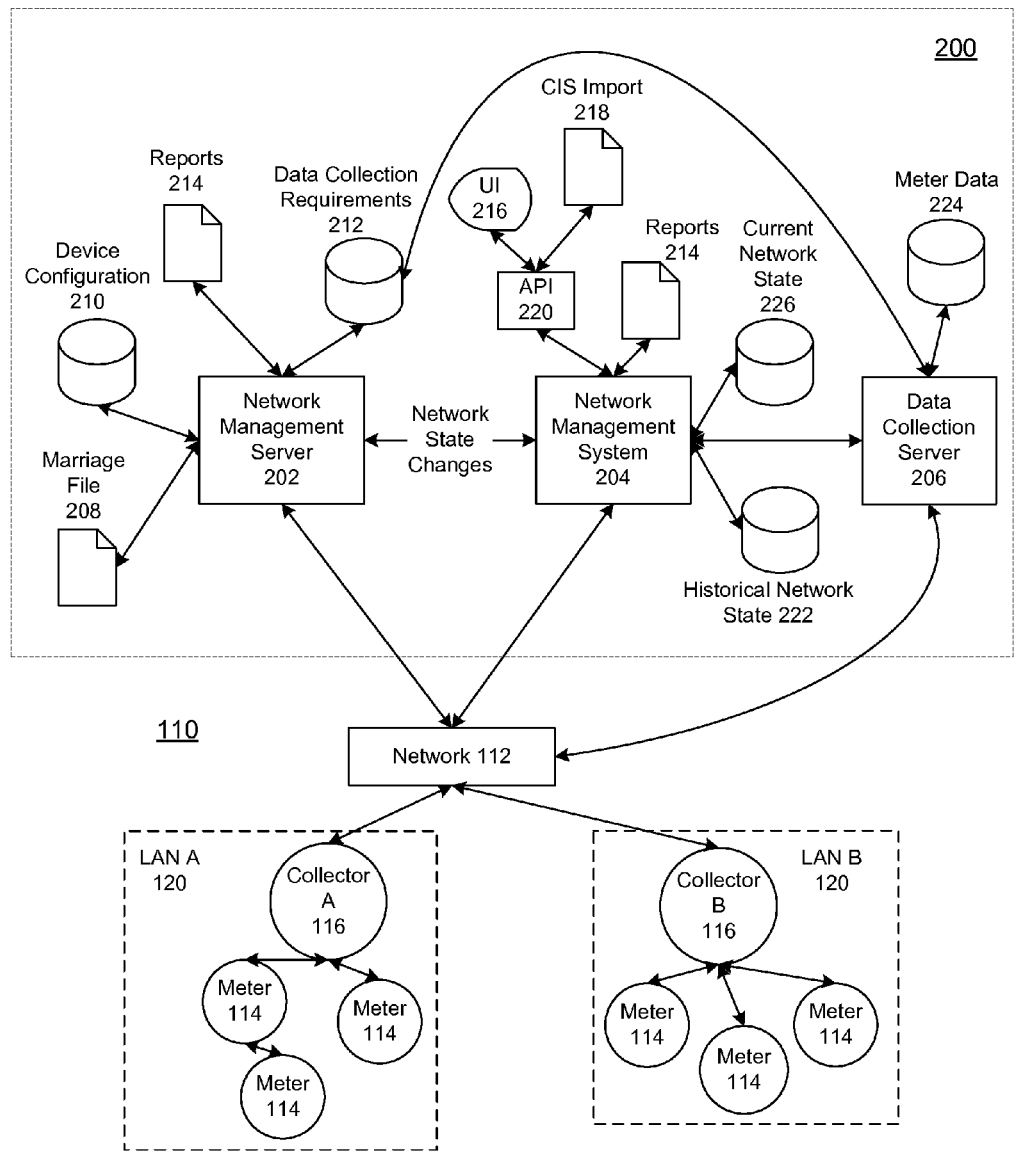
FIG. 2 expands upon the diagram of FIG. 1 and illustrates the exemplary metering communication system in greater detail.

Referring now to FIG. 2, further details of the metering communication system 110 (AMI) are shown. Typically, the system will be operated by a utility company or a company providing information technology services to a utility company. In FIG. 2, some or all of the components illustrated in dashed-box 200 may be referred to as a utility's "operations center," "head-end," or similar name. As shown, the operations center 200 may comprise head-end devices such as a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114 and collectors 116 is assigned an identifier (LAN ID) that uniquely identifies that meter or collector on its subnet/LAN 120. In this embodiment, communication between nodes (e.g., the collectors and meters) and the communication system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (e.g., a serial number assigned by the manufacturer of the meter) and the LAN ID for each node in the subnet/LAN 120. In this manner, the utility may refer to the meters and collectors by the utility's identifier, while the system may employ the LAN ID for the purpose of designating particular meters during system communications.

A device configuration database 210 stores configuration information regarding the nodes. For example, in the metering communication system 110, the device configuration database may include data regarding time of use (TOU) switchpoints, etc. for the meters 114 and collectors 116 communicating in the system 110. A data collection requirements database 212 includes information regarding the data to be collected on a per node basis. For example, a utility may specify that metering data such as load profile, demand, TOU, etc. is to be collected from particular meter(s) 114a. Reports 214 including information on the network configuration may be automatically generated or in accordance with a utility request.

The network management system (NMS) 204 may maintain a database describing the current state of the global fixed network system (current network state 226) and a database describing the historical state of the system (historical network state 222). The current network state 226 contains data regarding current meter-to-collector assignments, etc. for each subnet/LAN 120. The historical network state 222 is a database from which the state of the network at a particular point in the past may be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 may collect data from the nodes (e.g., collectors 116) and store the data in a database 224. The data may include metering information, such as energy consumption, and may be used for billing purposes, etc. by a utility provider.

The network management server 202, network management system 204 and data collection server 206 communicate with the nodes in each subnet/LAN 120 via network 112.

Figure 3A:
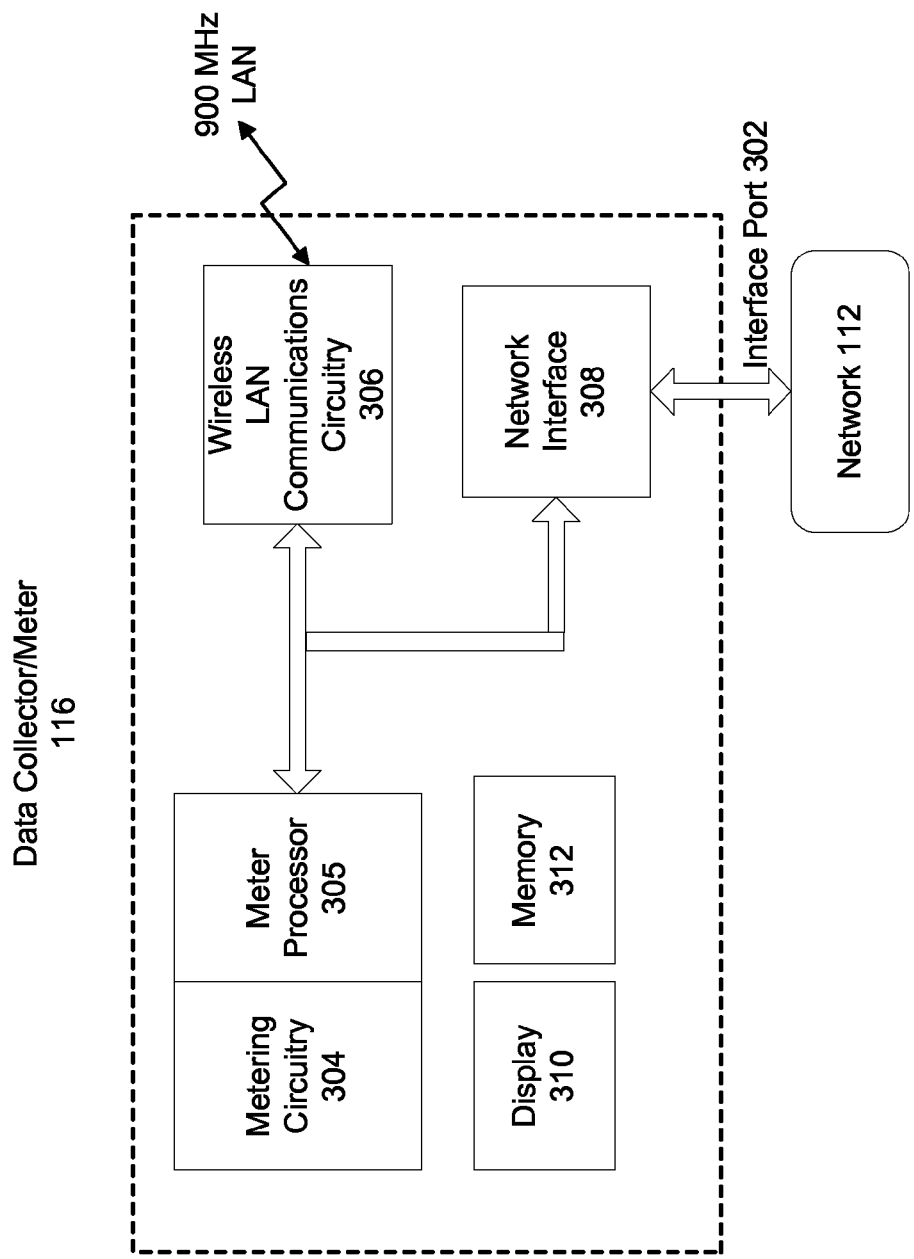
FIG. 3A is a block diagram illustrating an exemplary gatekeeper (also referred to as a "collector") of the metering communication system of FIG. 1.

FIG. 3A is a block diagram illustrating further details of one embodiment of a collector 116. Although certain components are designated and discussed with reference to FIG. 3A, such designations and discussion are not limiting. In fact, various other components typically found in an electronic meter may be a part of collector 116, but have not been shown in FIG. 3A for the purposes of clarity and brevity. Also, other components may be used to accomplish the operation of collector 116. The components that are shown and the functionality described for collector 116 are provided as examples, and are not meant to be exclusive of other components or other functionality.

As shown in FIG. 3A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In an embodiment, the metering circuitry 304, processor 305, display 310 and memory 312 may be implemented using an A3 ALPHA meter available from Elster Solutions, LLC. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 may route messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing it's time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and/or the WAN Option Board 308.

The responsibility of a collector 116 is wide and varied. Generally, collector 116 may be responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

In an embodiment, the LAN Option Board 306 may employ a CC1110 chip available from Texas Instruments Incorporated® to implement its wireless transceiver functionality. The CC1110 chip has a built-in Received Signal Strength Indication (RSSI) capability that provides a measurement of the power present in a received radio signal.

Figure 3B:
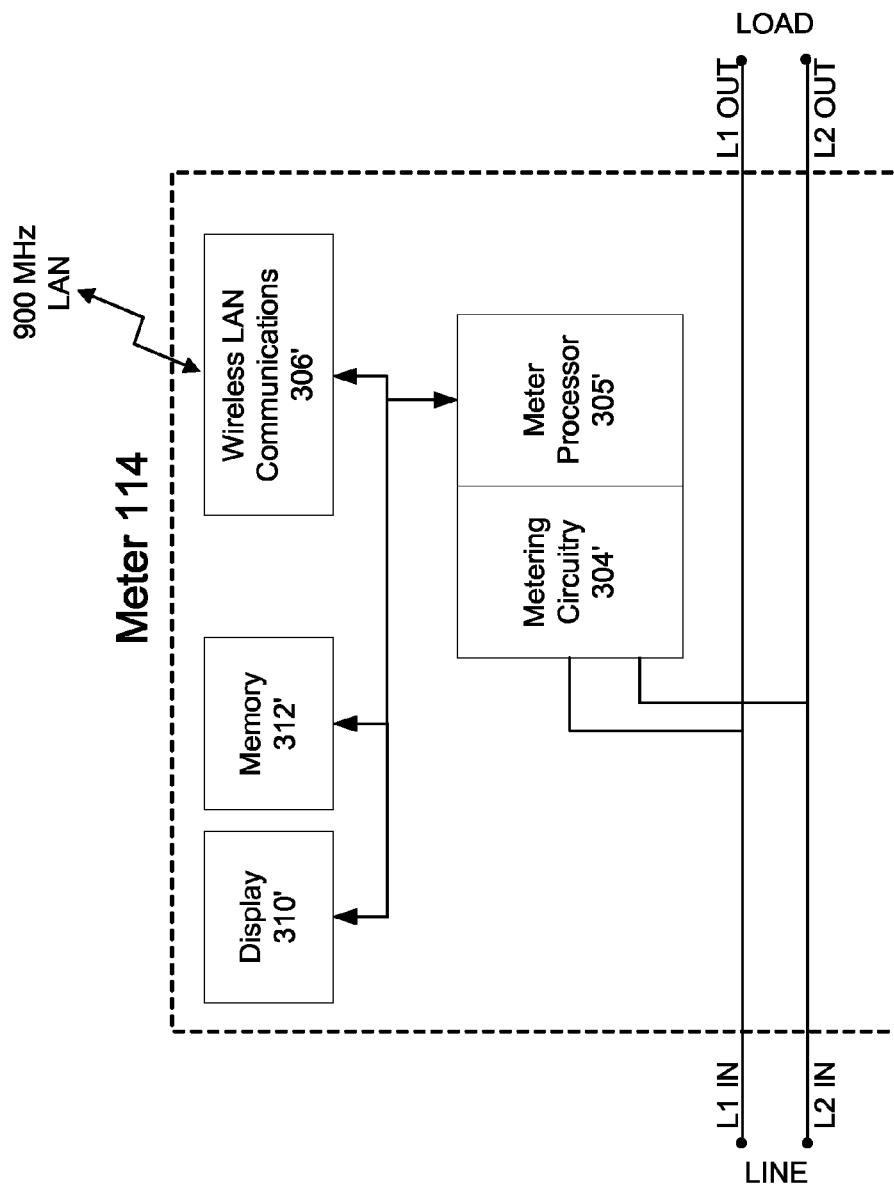
FIG. 3B is a block diagram illustrating an exemplary metering device of the metering communication system of FIG. 1.

FIG. 3B is a block diagram of an exemplary embodiment of a meter 114 that may operate in the system 110 of FIGS. 1 and 2. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306', such as a transceiver, for transmitting and receiving data to/from other meters 114 or a collector 116. The wireless communication circuitry 306' may comprise, for example, the aforementioned CC1110 chip available from Texas Instruments Incorporated®.

Referring again to FIG. 1, in an embodiment, a collector 116 directly communicates with a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a may operate as repeaters for communications between collector 116 and meters 114 located further away in subnet 120.

Each level one meter 114a may be in range to directly communicate with a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While three levels of meters are shown (collector 116, first level 114a, second level 114b) in FIG. 1, a subnet 120 may comprise any number of levels of meters 114. For example, a subnet 120 may comprise one level of meters but might also comprise eight, sixteen, thirty-two or even more levels of meters 114. In an embodiment, as many as 2048 or more meters may be registered with a single collector 116.

As mentioned herein, in an embodiment, each meter 114 and collector 116 that is installed in the system 110 may have a unique identifier (LAN ID) stored thereon that uniquely identifies the device from the other devices in the system 110. Additionally, meters 114 operating in a subnet 120 may comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and/or if the meter operates as a repeater, the identifier that uniquely identifies the repeater within the particular subnet, and the number of meters for which it is a repeater. In one embodiment, collectors 116 have stored thereon this same data for meters 114 that are registered therewith. Thus, collector 116 comprises data identifying the nodes registered therewith as well as data identifying the registered path by which data is communicated from the collector to each such node. Each meter 114 therefore has a designated communications path to the collector that is either a direct path (e.g., all level one nodes) or an indirect path through one or more intermediate nodes that serve as repeaters.

In an embodiment, information is transmitted in the form of packets. For most network tasks such as, for example, reading meter data, collector 116 communicates with meters 114 in the subnet 120 using point-to-point transmissions. For example, a message or instruction from collector 116 may be routed through the designated set of repeaters to the desired meter 114. Similarly, a meter 114 may communicate with collector 116 through the same set of repeaters, but in reverse.

In some instances, however, collector 116 may quickly communicate information to the meters 114 located in its subnet 120. Accordingly, collector 116 may issue a broadcast message that is meant to reach all nodes in the subnet 120. The broadcast message may be referred to as a "flood broadcast message." A flood broadcast may originate at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message may pick a random time slot and communicate the broadcast message to third level meters. This process may continue out until the end nodes of the subnet. Thus, a broadcast message gradually propagates outward from the collector to the nodes of the subnet 120.

The flood broadcast packet header may include information to prevent nodes from repeating the flood broadcast packet more than once per level. For example, within a flood broadcast message, a field might exist that indicates to meters/nodes which receive the message, the level of the subnet the message is located; nodes at that particular level may re-broadcast the message to the next level. If the collector broadcasts a flood message with a level of 1, level 1 nodes may respond. Prior to re-broadcasting the flood message, the level 1 nodes increment the field to 2 so that level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, it may not be possible to rely upon the clocks internal to meters 114 to provide accurate time readings. Having the correct time may be necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages may be used in subnet 120 to transmit unexpected events that occur at meters 114 to collector 116. In an embodiment, the first 4 seconds of every 32-second period may be allocated as an exception window for meters 114 to transmit exception messages. Meters 114 may transmit their exception messages early enough in the exception window so the message has time to propagate to collector 116 before the end of the exception window. Collector 116 may process the exceptions after the 4-second exception window. Generally, a collector 116 acknowledges exception messages, and the collector 116 waits until the end of the exception window to send this acknowledgement.

In an illustrative embodiment, exception messages may be configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the data collection server 206 on a regular schedule.

Exceptions may be processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed herein, collector 116 transmits a command to initiate a scan procedure to the meter 114 from which the exception was received.

If an immediate exception type has been received, collector 116 may make a record of the exception. An immediate exception might identify, for example, that there has been a power outage. Collector 116 may log the receipt of the exception in one or more tables or files. In an illustrative example, a record of receipt of an immediate exception is made in a table which may be referred to as the "Immediate Exception Log Table." Collector 116 may then wait a set period of time before taking further action with respect to the immediate exception. For example, collector 116 may wait 64 seconds. This delay period may allow the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 may communicate the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes for example. This may be to avoid reporting exceptions from other meters 114 that relate to, or have the same cause as, the exception that was just reported.

If a daily exception was received, the exception may be recorded in a file or a database table. Generally, daily exceptions are occurrences in the subnet 120 that may be reported to data collection server 206, but are not so urgent that they may be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to data collection server 206. Generally, collector 116 may communicate the daily exceptions once every 24 hours.

In an embodiment, a collector may assign designated communications paths to meters with bi-directional communication capability, and may change the communication paths for previously registered meters if conditions warrant. For example, when a collector 116 is initially brought into system 110, it may identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "single node scan."

A full node scan may be performed, for example, when a collector is first installed. The collector 116 identifies and registers nodes from which it will collect usage data. The collector 116 may initiate a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore may be detected at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (e.g., a measurement of the received radio signal strength) measured with respect to the received response from the meter to a selected threshold value. For example, the threshold value may be −60 dBm. RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry may include the meter's LAN ID, its qualification score (e.g., 5 out of 10; or its RSSI value), its level (in this case level one) and/or the unique ID of its parent (in this case the collector's ID).

If the qualification threshold is met or exceeded, the collector 116 may register the node. Registering a meter 114 comprises updating a list of the registered nodes at collector 116. For example, the list may be updated to identify the meter's system-wide unique identifier and the communication path to the node. Collector 116 also records the meter's level in the subnet (e.g., whether the meter is a level one node, level two node, etc.), whether the node operates as a repeater, and if so, the number of meters for which it operates as a repeater. The registration process further comprises transmitting registration information to the meter 114. For example, collector 116 may forward to meter 114 an indication that it is registered, the unique identifier of the collector with which it is registered, the level the meter exists at in the subnet, and/or the unique identifier of its parent meter that may serve as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process may continue by performing a similar process as that described above at each of the now registered level one nodes. This process may result in the identification and registration of level two nodes. After the level two nodes are identified, a similar node scan process may be performed at the level two nodes to identify level three nodes, and so on.

Specifically, to identify and register meters that may become level two meters, for each level one meter, in succession, the collector 116 transmits a command to the level one meter, which may be referred to as an "Initiate Node Scan Procedure" command. This command instructs the level one meter to perform its own node scan process. The request may comprise several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Procedure request responds by performing a node scan process similar to that described above. More specifically, the meter broadcasts a request to which all unregistered nodes may respond. The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request may wait for and receive responses from unregistered nodes. For each response, the meter may store in memory the unique identifier of the responding meter. This information is then transmitted to the collector.

For each unregistered meter that responded to the node scan issued by the level one meter, the collector attempts again to determine the reliability of the communication path to that meter. In one embodiment, the collector may send a "Qualify Nodes Procedure" command to the level one node which may instruct the level one node to transmit a predetermined number of additional packets to the potential level two node and to record the number of acknowledgements received back from the potential level two node. This qualification score (e.g., 8 out of 10) may then be transmitted back to the collector, which may again compare the score to a qualification threshold. In other embodiments, other measures of the communications reliability may be provided, such as an RSSI value.

If the qualification threshold is not met, then the collector may add an entry for the node in the Straggler Table, as discussed above. However, if there already is an entry in the Straggler Table for the node, the collector may update that entry if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information may be updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the Initiate Node Scan Procedure request may be updated to identify that it operates as a repeater and, if it was previously registered as a repeater, increments a data item identifying the number of nodes for which it serves as a repeater. Thereafter, collector 116 may forward to the newly registered meter an indication that it is registered, an identification of the collector 116 with which it is registered, the level the meter exists at in the subnet, and/or the unique identifier of the node that will serve as its parent, or repeater, when it communicates with the collector 116.

The collector may then perform the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector may then send the Initiate Node Scan Procedure request to each level two node, in turn. Each level two node will then perform the same node scan procedure as performed by the level one nodes, potentially resulting in the registration of a number of level three nodes. The process may then be performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop." For example, if an unregistered node responds to a node scan request from a level four node, and therefore, becomes a potential level five node, the qualification score for that node may be based on the reliability of communications between the level four node and the potential level five node (e.g., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (e.g., level one nodes) or an indirect path through one or more intermediate nodes that serve as repeaters. If during operation of the network, a meter registered in this manner fails to perform adequately, it may be assigned a different path or possibly to a different collector as described herein.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "single node scan." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a single node scan of a meter 114 when during the course of a full node scan the collector 116 was unable to read the node scan data from the meter 114. Similarly, a single node scan may be performed when an exception procedure requesting an immediate node scan is received from a meter 114.

The system 110 may automatically reconfigure to accommodate a new meter 114 that may be added. More particularly, the system may identify that the new meter has begun operating and identifies a path to a collector 116 that will become responsible for collecting the metering data. Specifically, the new meter may broadcast an indication that it is unregistered. In one embodiment, this broadcast might be, for example, embedded in, or relayed as part of a request for an update of the real time as described above. The broadcast may be received at one of the registered meters 114 in proximity to the meter that is attempting to register. The registered meter 114 forwards the time to the meter that is attempting to register. The registered node may also transmit an exception request to its collector 116 requesting that the collector 116 implement a node scan, which presumably will locate and register the new meter. The collector 116 may then transmit a request that the registered node perform a node scan. The registered node may perform the node scan, during which it requests that the unregistered nodes respond. Presumably, the newly added, unregistered meter will respond to the node scan. When it does, the collector may then attempt to qualify and then register the new node in the same manner as described above.

Once a communication path between the collector and a meter is established, the meter may begin transmitting its meter data to the collector and the collector may transmit data and instructions to the meter. Data transmission between a collector and the meters in its subnet are, in one embodiment, performed in accordance with the following communications protocol. In this protocol, data is transmitted in packets. "Outbound" packets are packets transmitted from a head-end device and/or the collector to a meter at a given level. A meter may be referred to as an end device. In an embodiment, as illustrated in FIG. 3C, outbound packets include the following fields, but other fields may also be included:

Length—the length of the packet;
SrcAddr—source address—in this case, the LAN ID of the collector;
DestAddr—the LAN ID of the meter to which the packet is addressed;
RptPath—the communication path to the destination meter (e.g., the list of identifiers of each repeater in the path from the collector to the destination node); and
Data—the payload of the packet.
The packet may also include integrity check information (e.g., CRC), a pad to fill-out unused portions of the packet and other control information. When the packet is transmitted from the collector, it may be forwarded on to the destination meter by those repeater meters whose identifiers appear in the RptPath field. Other meters may receive the packet, but meters that are not listed in the path identified in the RptPath field may not repeat the packet.

"Inbound" packets are packets transmitted from a meter (e.g., an end device) at a given level to the collector. In one embodiment, as illustrated in FIG. 3D, inbound packets include the following fields, but other fields may also be included:

Length—the length of the packet;
SrcAddr—source address—the LAN ID of the meter that initiated the packet;
DestAddr—the LAN ID of the collector to which the packet is to be transmitted;
RptAddr—an identifier of the parent node that serves as the next repeater for the sending node;
Data—the payload of the packet;
Because each meter knows the identifier of its parent node (e.g., the node in the next lower level that serves as a repeater for the present node), an inbound packet may identify who is the next parent. When a node receives an inbound packet, it may check to see if the RptAddr matches its own identifier. If not, it discards the packet. If so, it knows that it is supposed to forward the packet on toward the collector. The node may then replace the RptAddr field with the identifier of its own parent and transmit the packet so that its parent will receive it. This process may continue through each repeater at each successive level until the packet reaches the collector.

For example, suppose a meter at level three initiates transmission of a packet destined for its collector. The level three node may insert in the RptAddr field of the inbound packet the identifier of the level two node that serves as a repeater for the level three node. The level three node may then transmit the packet. Several level two nodes may receive the packet, but the level two node having an identifier that matches the identifier in the RptAddr field of the packet may be the one to acknowledge it. The others may discard it. When the level two node with the matching identifier receives the packet, it may replace the RptAddr field of the packet with the identifier of the level one node that serves as a repeater for that level two node, and the level two node may then transmit the packet. This time, the level one node having the identifier that matches the RptAddr field may receive the packet. The level one node may insert the identifier of the collector in the RptAddr field and may transmit the packet. The collector may then receive the packet to complete the transmission.

A collector 116 may periodically retrieve meter data from the meters that are registered with it. For example, meter data may be retrieved from a meter every 4 hours. Where there is a problem with reading the meter data on the regularly scheduled interval, the collector may try to read the data again before the next regularly scheduled interval. Nevertheless, there may be instances wherein the collector 116 is unable to read metering data from a particular meter 114 for a prolonged period of time. The meters 114 may store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired success level, the collector 116 may transmit a message to the meter 114 to respond to node scans going forward. The meter 114 may remain registered but will respond to node scans in the same manner as an unregistered node as described above. In other embodiments, the registered meters may be permitted to respond to node scans, but a meter may respond to a node scan if the path to the collector through the meter that issued the node scan is shorter (e.g., less hops) than the meter's current path to the collector. A lesser number of hops is assumed to provide a more reliable communication path than a longer path. A node scan request may identify the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path may be rejected. However, if the RSSI threshold is met, the collector 116 will request that the node that issued the node scan perform the qualification process described herein (e.g., send a predetermined number of packets to the node and count the number of acknowledgements received). If the resulting qualification score satisfies a threshold, then the collector may register the node with the new path. The registration process comprises updating the collector 116 and meter 114 with data identifying the new repeater (e.g., the node that issued the node scan) with which the updated node may now communicate. Additionally, if the repeater has not previously performed the operation of a repeater, the repeater may need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, the qualification of the last "hop" (e.g., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 may not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 may not respond to the node scan.

If it is determined that the path to the new collector may be better than the path to its existing collector, the meter 114 may respond to the node scan. Included in the response is information regarding any nodes for which the particular meter may operate as a repeater. For example, the response might identify the number of nodes for which the meter serves as a repeater.

The collector 116 may then determine if it has the capacity to service the meter and any meters for which it operates as a repeater. If not, the collector 116 may not respond to the meter that is attempting to change collectors. If, however, the collector 116 determines that it has capacity to service the meter 114, the collector 116 stores registration information about the meter 114. The collector 116 may then transmit a registration command to meter 114. The meter 114 updates its registration data to identify that it is now registered with the new collector. The collector 116 may then communicate instructions to the meter 114 to initiate a node scan request. Nodes that are unregistered, or that had previously used meter 114 as a repeater respond to the request to identify themselves to collector 116. The collector may register these nodes as is described herein in connection with registering new meters/nodes.

Under some circumstances it may be desirable to change a collector. For example, a collector may be malfunctioning and may be taken off-line. Accordingly, a new communication path may be provided for collecting meter data from the meters serviced by the particular collector. The process of replacing a collector is performed by broadcasting a message to unregister, usually from a replacement collector, to the meters that are registered with the collector that is being removed from service. In one embodiment, registered meters may be programmed to respond to commands from the collector with which they are registered. Accordingly, the command to unregister may comprise the unique identifier of the collector that is being replaced. In response to the command to unregister, the meters begin to operate as unregistered meters and respond to node scan requests. To allow the command to unregister to propagate through the subnet, when a node receives the command it may not unregister immediately, but rather remain registered for a defined period, which may be referred to as the "Time to Live". During this time to live period, the nodes continue to respond to application layer and immediate retries allowing the unregister command to propagate to all nodes in the subnet. Ultimately, the meters register with the replacement collector using the procedure described above.

One of the collector's 116 main responsibilities within subnet 120 is to retrieve metering data from meters 114. In one embodiment, collector 116 has as a goal to obtain at least one successful read of the metering data per day from each node in its subnet. Collector 116 may attempt to retrieve the data from the nodes in its subnet 120 at a configurable periodicity. For example, collector 116 may be configured to attempt to retrieve metering data from meters 114 in its subnet 120 once every 4 hours. In greater detail, in one embodiment, the data collection process may begin with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing may continue. However, if the meters 114 in subnet 120 have been read, the collector waits a defined length of time, such as, for example, 4 hours, before attempting another read.

If during a read of a particular meter, the meter data is not received at collector 116, the collector 116 may begin a retry procedure wherein it attempts to retry the data read from the particular meter. Collector 116 may continue to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

In an embodiment, data collected and stored in the meters 114 of the system 110 of FIGS. 1, 2, 3A and 3B is organized and extracted from each meter 114 in accordance with American National Standards Institute (ANSI) standard C12.19. The ANSI C12.19 standard defines a table structure for utility application data to be passed between an end device, such as a meter 114, and a computer or an AMI head-end device, such as the Network Management Server 204 of FIG. 2. The purpose of the tables is to define structures for transporting data to and from end devices. C12.19 defines both a "standard table" structure and a "manufacturers table" structure. In this embodiment, the Network Management Server 204 includes a set of commands for reading data from, and writing data to, one or more C12.19 tables in an end device, such as a meter 114. Those commands may be transmitted to a meter 114 or other node in accordance with the wireless networking protocol described above.

The end devices described herein, such as meters 114 for example, may be remotely configured via an AMI network. Described below are various techniques (methods, systems and/or apparatus) for providing remote configuration of an end device, such as a meter. For example, an end device may receive a program recipe via an AMI network. The program recipe may be specific to the end device and formatted according to a generic program table of the end device.

FIG. 4 is a block diagram illustrating the remote programming of an end device 400 in accordance with one embodiment. End devices may be manufactured by a variety of vendors and/or manufacturers, and manufacturers may develop programming tools to reconfigure their end devices. The example embodiment shown in FIG. 4 depicts an AMI solution that may utilize end-devices and a configuration tool associated with Vendor A communicating through an AMI network 402 associated with Vendor B. For example, the end device 400 may be manufactured by Vendor A, the configuration tool 404 may be developed by Vendor A, and the AMI network 402 may be developed by Vendor B. In one embodiment, the configuration tool 404 is implemented as an application running on the AMI network 402. As shown in FIG. 4, Vendor B's AMI network 402 may comprise an AMI head-end 406 and an end device network interface card (NIC) 408. The end-device NIC 408 may be integrated with Vendor A's end device 400 as a single package, a separate package, or a combination thereof. A set of programming operations and/or configuration data for programming or configuring an end device manufactured by Vendor A, referred to herein as a program recipe 410, may be sent through the AMI network 402 of Vendor B to the end device 400 of Vendor A.

In the embodiment shown in FIG. 4, for example, a program recipe for the end device 400 is encrypted prior to being transmitted through the AMI network 402 of Vendor B. In an embodiment, the program recipe for end device 400 is created by Vendor A using a configuration tool 404, in combination with a generic device configuration document 414 and meta-data 412. Encrypting the program recipe ensures that Vendor A's end-device 400 may access the program recipe body, but the AMI network 402 of Vendor B may not. Vendor B's AMI system may know the components the program is reconfiguring in the end-device 400 (e.g., by deciphering meta-data 412) and may know which specific end-device models and/or styles may be reconfigured using a particular program recipe. Thus, that knowledge of "what" is being programmed (e.g., component identities) may be exchanged and accessible to both Vendor A's end devices and Vendor B's AMI System, but the knowledge of "how" to program an end device is not exposed to another party.

The device configuration tool 404 may produce an encrypted program recipe 410 specific to the end device 400 and an end device generic program table (not shown) that may receive the encrypted program recipe 410. The end device 400 may decrypt, validate, and/or implement the program recipe that may be loaded into the end device 400 generic program table. As mentioned above, a program recipe is a set of programming operations and/or configuration data for programming or configuring an end device associated with a particular end device vendor. In one embodiment, a program recipe may comprise an ordered sequence of ANSI C12 style table operations that may relate to common and/or manufacturer-specific end device tables and functions. For example, a user may input configuration parameters into the device configuration tool 404 to configure the end device 400. The device configuration tool 404 may provide user authentication and/or authorization in order to program the end device 400. A program recipe may be written into the end-device 400 via the AMI network 402 using a C12 write mechanism, for example, that uses a table identifier, table offset, and/or a program recipe length that may be specified in meta-data 412. In an embodiment, an AMI system may know how to perform a C12 table write operation without having specific knowledge of the end-device tables or functions involved in the programming.

The configuration tool 404 may allow the abstraction of details for the end device 400 from the AMI network 402, for example, by providing the program recipe 410. For example, such details may be accessible by the Vendor A end device, but may not be accessible by devices in the Vendor B AMI network 402. The end device 402 may receive programming details, via the AMI network 402, in the program recipe 410 without devices in the AMI network 402 deciphering "how" the end device 400 is programmed Details of "how" the end device 400 is programmed may include, for example, specific tables, functions, and/or sequences of table writes and/or function executions for programing the end device 400. Since the program recipe 410 may comprise the knowledge and details of how the end device 400 is programmed, the program recipe 410 may be encrypted and passed through the AMI network 402 to the end device 400 for processing. The program recipe 410 may comprise a program recipe header and a detailed C12 command recipe that may be used for remote programming of the end device 400. Data may be formatted from the configuration tool 404 using a generic device configuration document 414 (e.g., XML format). The configuration tool 404 may use meta-data 412 to provide an overview of the program recipe 410 that may be sent to the end-device 400. The program overview (e.g., meta-data 412) is accessible to the AMI network 402 and may be used by the AMI network 402. Exemplary meta-data 412 that may be sent with a program recipe 410 includes an unique identifier (UUID) of the program (e.g., where a program may be comprised of one or more components that may be reconfigured with configuration parameters), a name of the program (e.g., may be user defined), a description of the program (e.g., may be user-defined), component types (e.g., time of use, LP, PQM, Demand, etc.) with corresponding unique component identifiers, a list of devices that may be applicable to the program (e.g., lists may comprise device families, device styles, a minimum firmware version, and/or a minimum hardware version), a minimum AMI head-end version supported by the program, a creator name, a creator identification, a creation time, a generic program table identifier, a generic program table offset, a program recipe length, a program output table identifier, a program output table offset, and a program output table length. The configuration tool 404 may format the end device program recipe 410 in a form compatible with the generic program table of the end device 400.

The device specific program recipe 410 may be comprised of one or more components, wherein a component may be configured with the configuration parameters of various component types such as interval data, time-of-use (TOU), demand, display, power quality, outage, restoration, and voltage for example. Referring to FIG. 4, the XML device configuration document 414 may be converted into a C12 table program recipe for a specific device type. The program recipe 410 may utilize various tables and functions including manufacturer-specific tables and functions. A header of the program recipe 410 may provide a cyclic redundancy check (CRC) or a message digest (e.g., MD5) signature for transport validation and/or a sequence identifier for replay protection. The program recipe 410 may comprise a digital signature of the device configuration tool 404.

The program recipe 410 may be encrypted in accordance with an advanced encryption standard (AES) using a seed from the vendor of the device configuration tool 404 and the end device 400 (e.g., Vendor A). In one embodiment, the device configuration tool 404 encrypts the program recipe 410 with a private key, and the end device 400 decrypts the encrypted program recipe 410 with the same private key used for the encryption. In other embodiments, other encryption/decryption techniques may be employed by the device configuration tool 404 and the end device 400 to secure the program recipe 410. The meta-data 412 (e.g., XML meta-data) may be prepended to the encrypted program recipe 410 and the resulting data may be encrypted, for example, by applying an AMI head-end vendor (e.g., Vendor B) encryption algorithm using public key cryptography. For example, the configuration tool 404 may encrypt the device configuration document 414 using a public key, and the AMI head-end 406 may decrypt the meta-data 412 using a Vendor B private key to access the meta-data 412. In other embodiments, other encryption/decryption techniques may be employed by the device configuration tool 404 and the head-end 406 to secure the meta-data 412. Thus, the meta-data 412 may be made accessible to the AMI network 402 (or its head-end 406) but not to other third parties; the encrypted program recipe 410 may be decrypted by and/or accessible to the end device of Vendor A, but not the AMI network 402.

Figure 5:
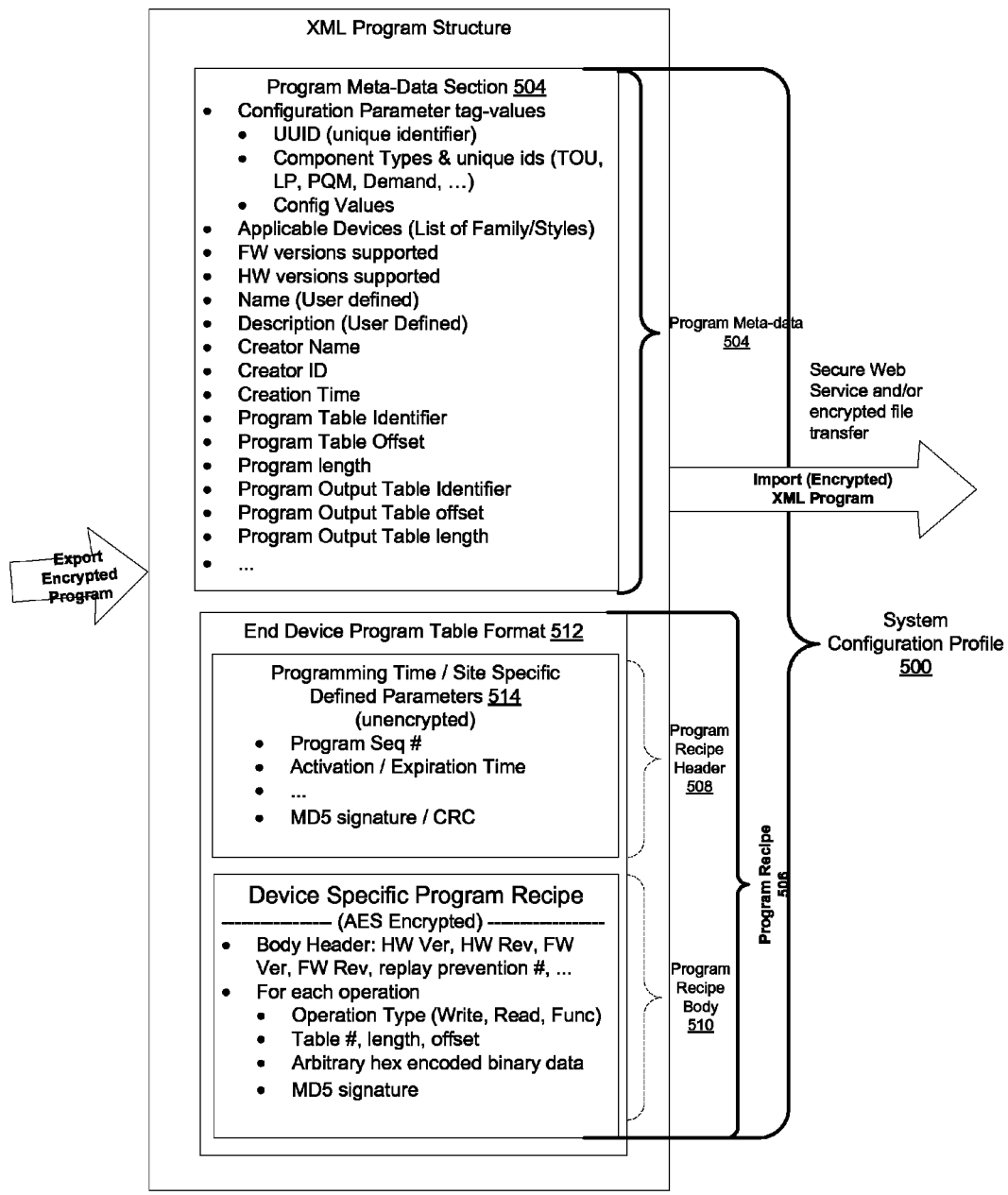
FIG. 5 shows one embodiment of an exemplary system configuration profile that may be used to configure one or more end devices.

FIG. 5 illustrates one embodiment of a system configuration profile 500 that may be used to encapsulate the meta-data 412 and specific program recipe 410 into the generic device configuration document 414 as discussed above in connection with FIG. 4. In one embodiment, the system configuration profile 500 may be implemented in an XML format. The system configuration profile 500 may be received by the end device 400 via the AMI network 402 of FIG. 4. For example, the system configuration profile 500 may be exported by the device configuration tool 404. The system configuration profile 500 may be imported by the AMI head-end 406. For example, the system configuration profile 500 may be imported via a secure web service and/or an encrypted file transfer.

In this embodiment, the system configuration profile 500, which comprises an XML program structure, comprises a program meta-data section 504 (to hold, for example, meta-data 412 of FIG. 4) and a program recipe section 506 (to hold, for example, the program recipe 410 of FIG. 4). The program recipe section 506 may comprise a program recipe header 508 and a program recipe body 510. The program recipe section 506 may be organized in an end device program table format 512. For example, the program recipe header 508 may comprise one or more programming time parameters and/or one or more site specific parameters that may be modified by the AMI head-end 406. An AMI network may adjust at least one site specific parameter or programming time parameter. The AMI head-end 406 may update or change parameters such as the program sequence number (or tracking number), activation time, expiration time, and other parameters that may vary based upon the specific site at which an end device is installed and/or the time of installation. The program recipe body 510 may comprise a body header. For example, the header of the program recipe body may comprise hardware (HW) and/or firmware (FW) minimum versions for compatibility validation, a CRC to validate transmission of data through networks, a configuration tool signature, and re-play attack prevention data (e.g., using a sequence number or other approach). The configuration tool 404 may provide encryption of the program recipe body 510 (e.g., including a body header) between the configuration tool 404 and the end device 400 (e.g., using an encryption algorithm of Vendor A). The configuration tool 404 may provide a program recipe header 508 which may be loaded with default values. The configuration tool 404 may encrypt the system configuration profile 500, including the meta-data 504, using an encryption algorithm of Vendor B. The configuration tool 404 may maintain logs such as program development logs and export audit logs, for example.

Still referring to FIG. 5, the system configuration profile 500 may be created by a utility, for example, to represent a specific configuration. For example, utilities may develop various configuration profiles corresponding to different consumer rates, outage and/or restoration settings, and/or voltage monitoring profiles. Exemplary system configuration profiles may be changed and/or applied to different sets of end devices over time. When a system configuration profile is applied to a new device or a set of devices, an XML program structure may enable programming time parameters (e.g., activation times) or site specific parameters (e.g., one or more transformer constants) to be changed as described herein.

In summary, in one embodiment, the system configuration profile 500 may be implemented in an XML format. The XML format of the system configuration profile 500 may comprise a program meta-data section 504 and a program recipe section 506 comprising a program recipe header 508 and a program recipe body 510. The program meta-data section 504 may be used by an AMI head-end system (e.g., AMI head-end 406 of FIG. 4). The meta-data section 504 may comprise information about the end device configuration profile such as unique identifiers, parameter values, identification of device types, applicable HW/FW versions/revisions, and creation attributes for example. The meta-data section 504 may allow a user or a part of the AMI head-end 406 to understand the configuration profile contents and to discover which specific type(s) of devices may be associated with the configuration profile. But the details of the program recipe, such as the body of the program recipe and the header of the program recipe body, are not accessible to that user or part of the AMI network.

The program recipe header 508 may comprise programming time and/or site specific parameters 514 in an unencrypted form. According to an embodiment, the parameters 514 may be modified by the AMI head-end 406 at configuration time. For example, the parameters 514 may be modified by an AMI head-end system to override programming time parameters such as activation time, expiration time, sequence numbers, and/or tracking numbers for example. The unencrypted program recipe header 508 may comprise overrides for site specific parameters such as transformer constants that, for example, may vary from location to location within an electrical distribution network. In one embodiment, the program recipe 506 may comprise the encrypted program recipe header 508 comprising site specific or programming time parameters that may be adjusted or changed by an AMI network as the program recipe 506 is applied to end devices over time.

The encrypted program recipe body 510 may comprise instructions for validating and implementing a program (configuration profile) within one or more devices. The instructions may be implemented in terms of table contents that may be modified and/or functions that may be executed in a particular order, for example, to apply the configuration profile to the end-devices specified in the program meta-data 504.

Figure 6:
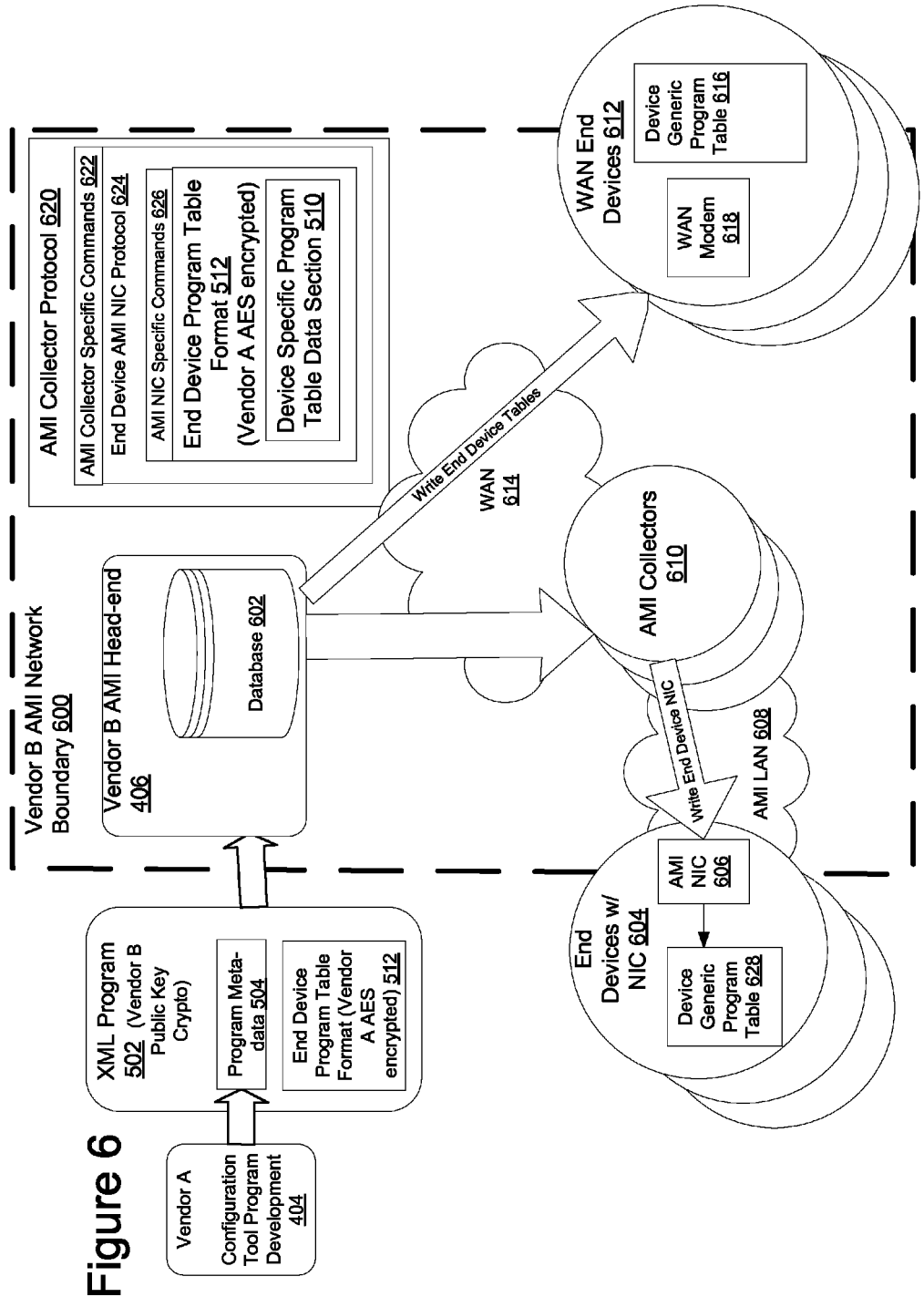
FIG. 6 is another block diagram illustrating further details of the remote programming of end devices in accordance with an embodiment.

FIG. 6 provides further details of the remote programming techniques discussed above in connection with FIG. 4. In FIG. 6, the Vendor B AMI Network is shown as comprising multiple end devices. With reference to FIGS. 4 through 6, in this example, the system configuration profile 500 may be imported by an AMI head-end system, such as the AMI head-end device 406 shown in FIGS. 4 and 6. The AMI head-end 406 may authenticate and/or authorize a user for program import. Referring to FIG. 4, the AMI head-end 406 may create a configuration profile (CP) for each program it receives at 416. The AMI head-end 406 may decrypt a portion (e.g., meta-data 412) of the system configuration profile, for example, using Vendor B public key cryptography. The AMI head-end device 406 may create and store a program (e.g., CP) in database 602 (FIG. 6). At 418, the CP may be staged by the AMI head-end 406 for an immediate and/or a scheduled future delivery. For example, the CP may be assigned to end devices by using the meta-data 412 to guide selection of the devices. Programming time parameters may be modified during the staging of the CP 418. The AMI head-end 406 may export the CP at 420. For example, AMI network 402 operations may be incorporated into the CP and the program recipe opaque payload may be transported via the AMI network 402.

FIG. 4 shows an example Vendor B end device NIC 408 that may be integrated in the Vendor A end device 400. The end device NIC 408 may be manufactured by a different vendor (e.g., Vendor B) than the manufacturer of the end device 400 (e.g., Vendor A). According to an embodiment, the end device network interface card (NIC) 408 may validate the CP transmittal and provide a pass-through write of the opaque program recipe.

Referring to FIG. 6, in this example, multiple fixed-network end devices 604 are shown, each including its own AMI NIC 606. The end devices 604 may communicate via an AMI local area network (LAN) 608 to one or more AMI collectors 610. The AMI head-end 406 may communicate with an AMI collector 610 and other direct-connected end devices 612 through one more WANs 614. The WANs may be comprised of varying technologies with varying capabilities, latencies, and/or protocols.

Figure 7A:
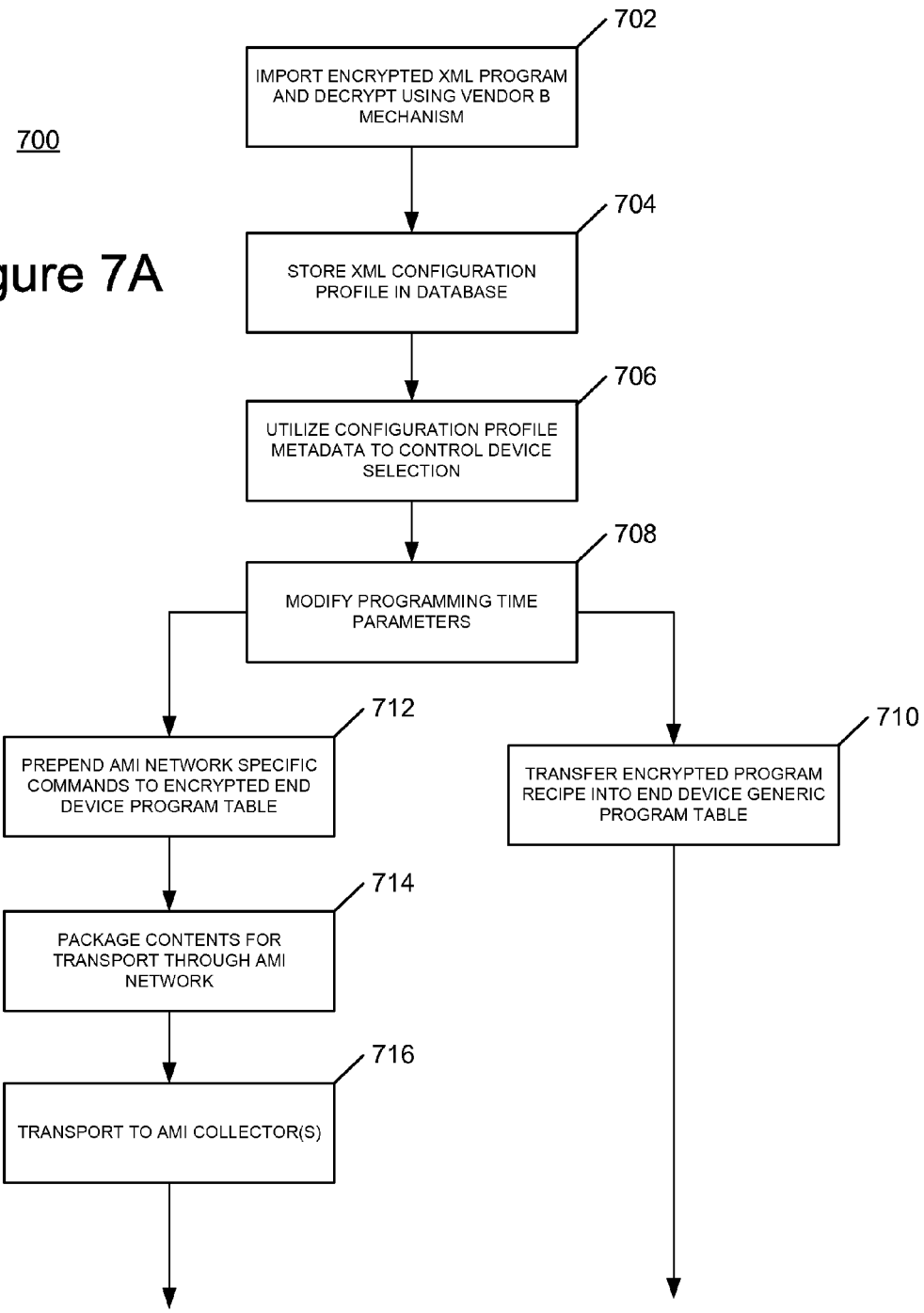
Figure 7C:
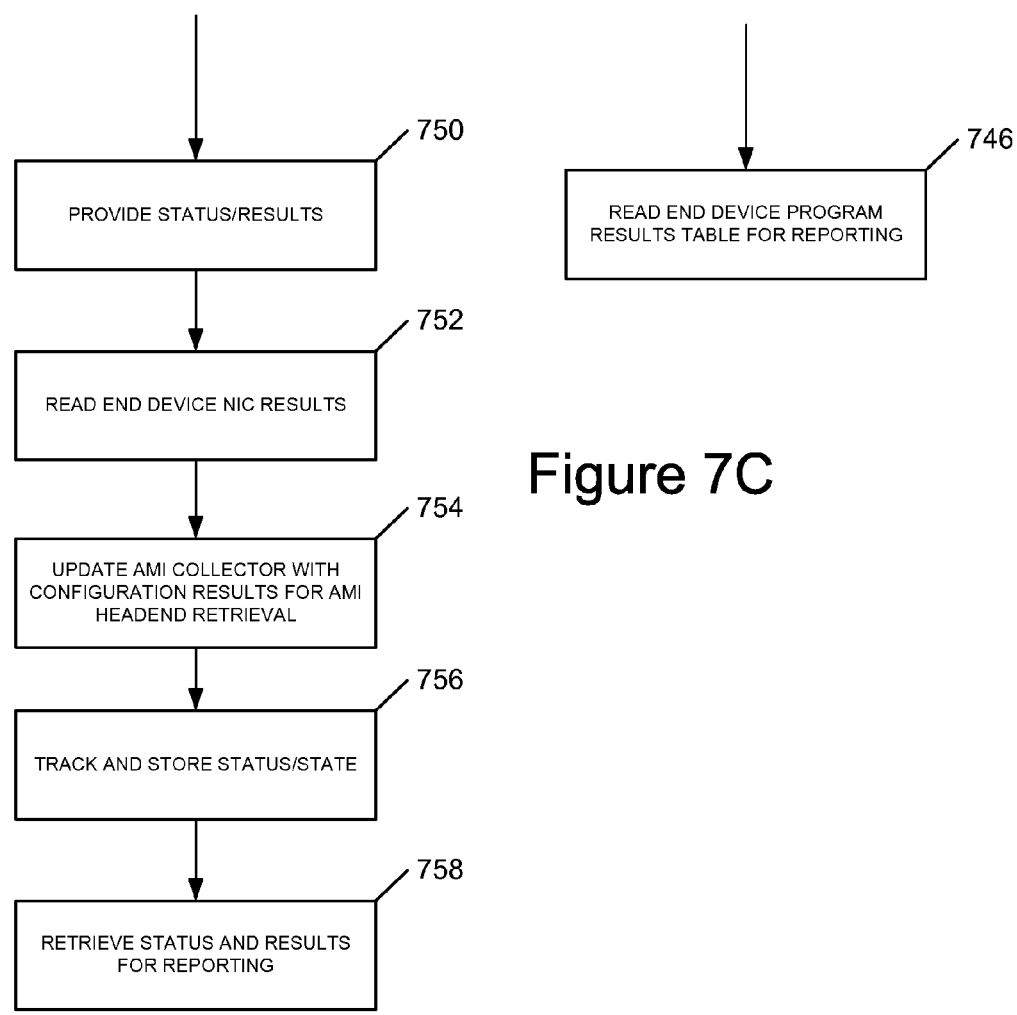

FIGS. 7A, 7B, and 7C comprise a flow diagram illustrating one embodiment of a remote programming operation 700 of one or more fixed network end-devices 604 and one or more direct connected end-devices 612 via the AMI network 600 of FIG. 6. FIG. 6 also shows the security and possible layering of protocols such as AMI collector protocol 620 that may be used for transport through an AMI network 600. According to an embodiment, the AMI system boundary 600 may use an integrated end device 604 with a package comprising Vendor B's end device NIC 606 and Vendor A's end device 604, for example, to limit cost and increase physical security.

Referring to FIG. 7A, at 702, the AMI head-end 406 may import an encrypted XML program and decrypt the program, for example, using a mechanism of the AMI head-end 406 vendor (e.g., Vendor B). At 704, the AMI head-end 406 may store the XML CP, for example, in database 602. The AMI head-end 406 may utilize meta-data 504 in the CP to determine device selection at 706. For example, the configuration profile may be assigned to a validated list of appropriate devices based upon program meta-data 504 such as an applicable end device list which may comprise a device family and/or style, a minimum FW version supported, and/or a minimum HW version supported. At 708, the AMI head-end 406 may supply and/or modify programming time parameters. If the CP may be delivered to one or more of the WAN end devices 612, the AMI head-end 406 may transfer the encrypted program recipe, via the WAN 614, into an end device generic program table 616 at 710. The writing of an end device program table 616 may be completed as an atomic operation performed across the WAN 614. The WAN-connected end devices 612 may each comprise a WAN modem 618.

If the configuration profile may be delivered to one or more of the direct-connected end devices 604, the process may proceed to step 712 from 708. At 712, the AMI head-end 406 may prepend commands specific to the AMI network 600 to an encrypted end device program table 512. At 714, the AMI head-end 406 may package the configuration contents for transport through the AMI network 600. The AMI head-end 406 may layer commands specific to an AMI network 600 for an end-device programming operation, for example, to increase flexibility and maintain a generic approach to remote programming. For example, the contents may comprise an AMI collector protocol 620, AMI collector specific commands 622, an end device AMI NIC protocol 624, AMI NIC specific commands 626, and an end device program table format 512. The end device program table format 512 may comprise the device specific program table section 510. According to an embodiment, the device specific program table data section 510 comprises arbitrary hex encoded binary data for writing an end device generic program table with a program recipe. At 716, the configuration profile (e.g., program recipe) may be transported to one or more AMI collectors 610 via a WAN 614.

The process may continue to 718 (FIG. 7B) wherein an AMI collector 610 may execute the one or more commands that may be specific to the AMI network 600. At 720, the data package (e.g., comprising AMI NIC commands 626 and end device program table contents 512) may be transferred and written to an AMI NIC 606 via an AMI LAN 608. At 722, the AMI collector 610 may delay (e.g., standby) for completion of the configuration. After the AMI NIC 606 receives the data package, the AMI NIC 606 may execute AMI NIC specific commands 626 at 724. At 726, the AMI NIC 606 may write the encrypted program recipe contents into the end device generic program table 626, for example, as an atomic operation. At 728, the AMI NIC 606 may delay (e.g., standby) for completion of the configuration.

At 730, the fixed-network end devices 604 and the WAN-connected end devices 612 may decrypt and validate the contents of their respective end device generic tables 628 and 616. For example, end devices 604 and 612 may store and decrypt program recipes using device specific logic 422 (FIG. 4). The end devices 604 and 612 may decrypt an encrypted program recipe using a key from the manufacturer of the end devices 604 and 612 (e.g., Vendor A) and may validate the transport through the AMI network 600. At 732, end devices 604 and 612 may check and update a sequence number for replay protection. At 734, end devices 604 and 612 may perform other security checks. For example, end devices 604 and 612 may verify a signature of the configuration tool 404. At 736, end devices 604 and 612 may validate HW versions, FW versions, and/or feature compatibilities. After successful checks, the end devices 604 and 612 may implement C12 table operations at 738. At 740, the end devices 604 and 612 may apply programming time parameters. At 742, the end devices 604 and 612 may update their respective program results tables (e.g., audit logs) with status and/or results. At 744, the AMI head-end 406 may track and/or store the status and/or states of the end devices 612. At 746, the AMI head-end 406 may read the end device program results table for reporting. At 748, the AMI NIC 606 may track and/or store the status and/or states of the end devices 604. At 750, the AMI head-end 406 may provide the status and/or results to one or more of the AMI collectors 610. At 752, an AMI collector 610 may read the end device NIC 606 results. At 754, an AMI collector 610 may be updated with configuration results, for example, that may be retrieved by the AMI head-end 406. At 756, the AMI head-end 406 may track and/or store the status and/or states of the end devices 604. At 758, the AMI head-end 406 may retrieve the status and/or operation results for reporting. The AMI head-end 406 may retrieve snapshot data of a C12 configuration change. According to an embodiment, an AMI head-end 406 may provide event notification to external systems when CP events are generated and/or one or more CPs are changed.

Figure 8A:
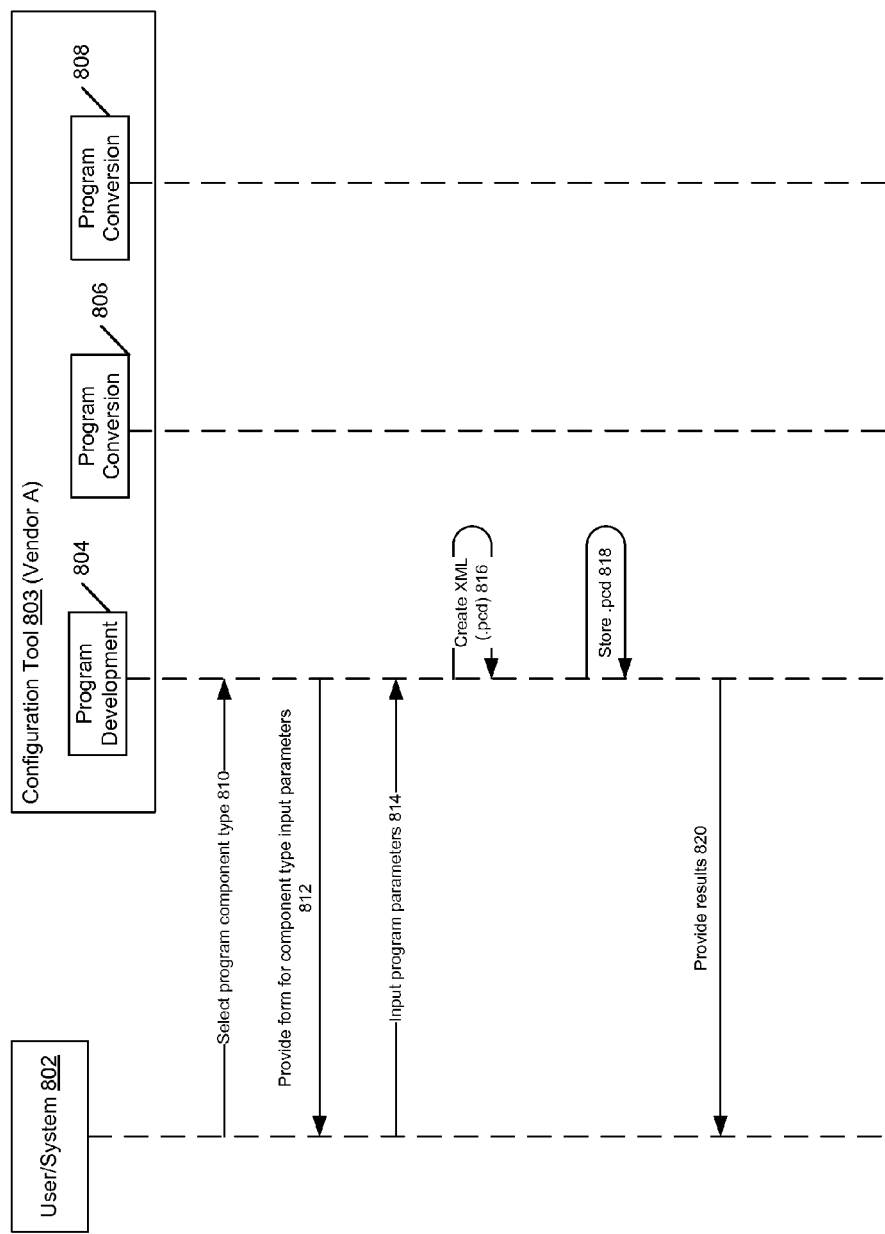
FIGS. 8A, 8B, and 8C comprise a sequence diagram illustrating the operation of an exemplary configuration tool in accordance with one embodiment thereof.
Figure 8B:
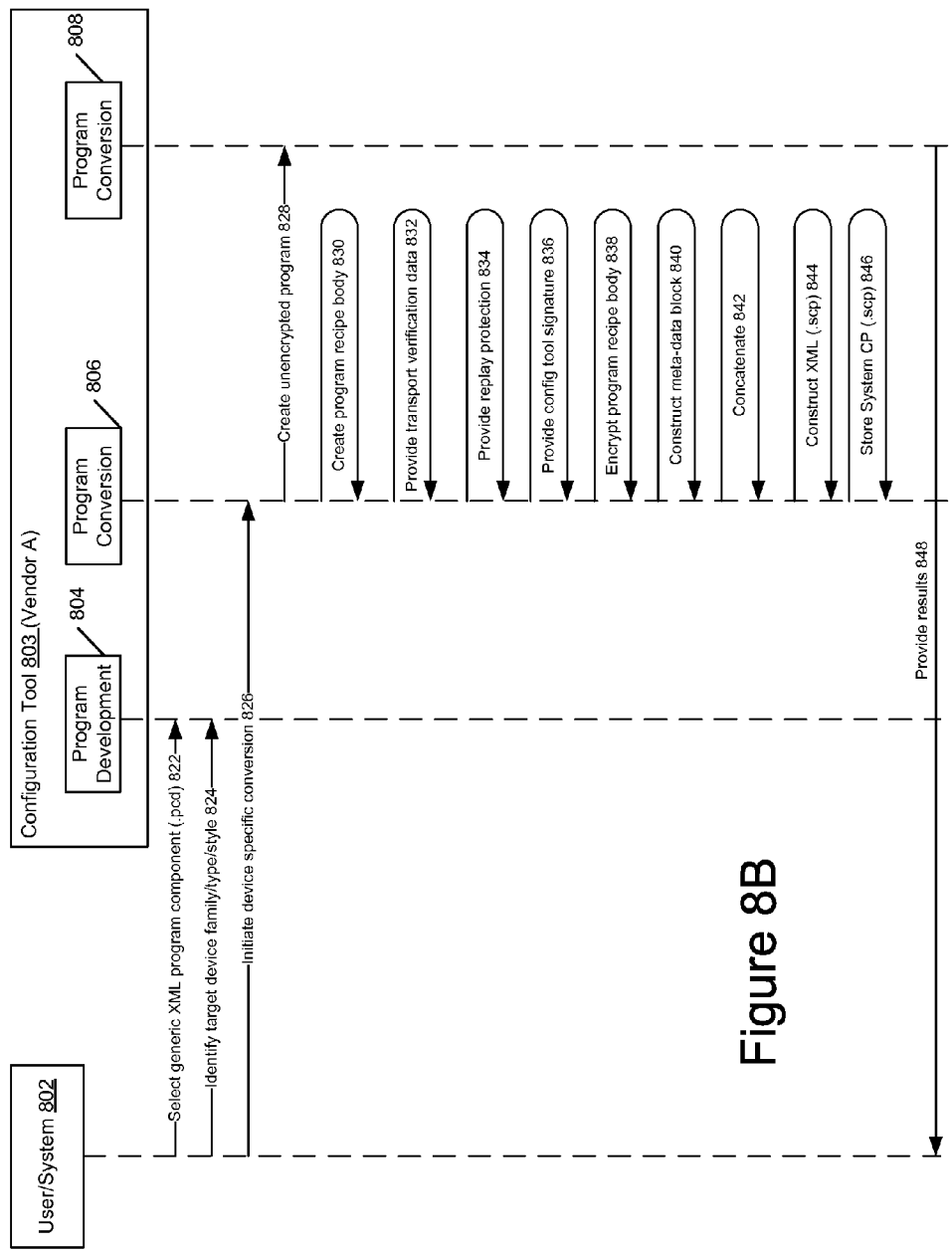
Figure 8C:
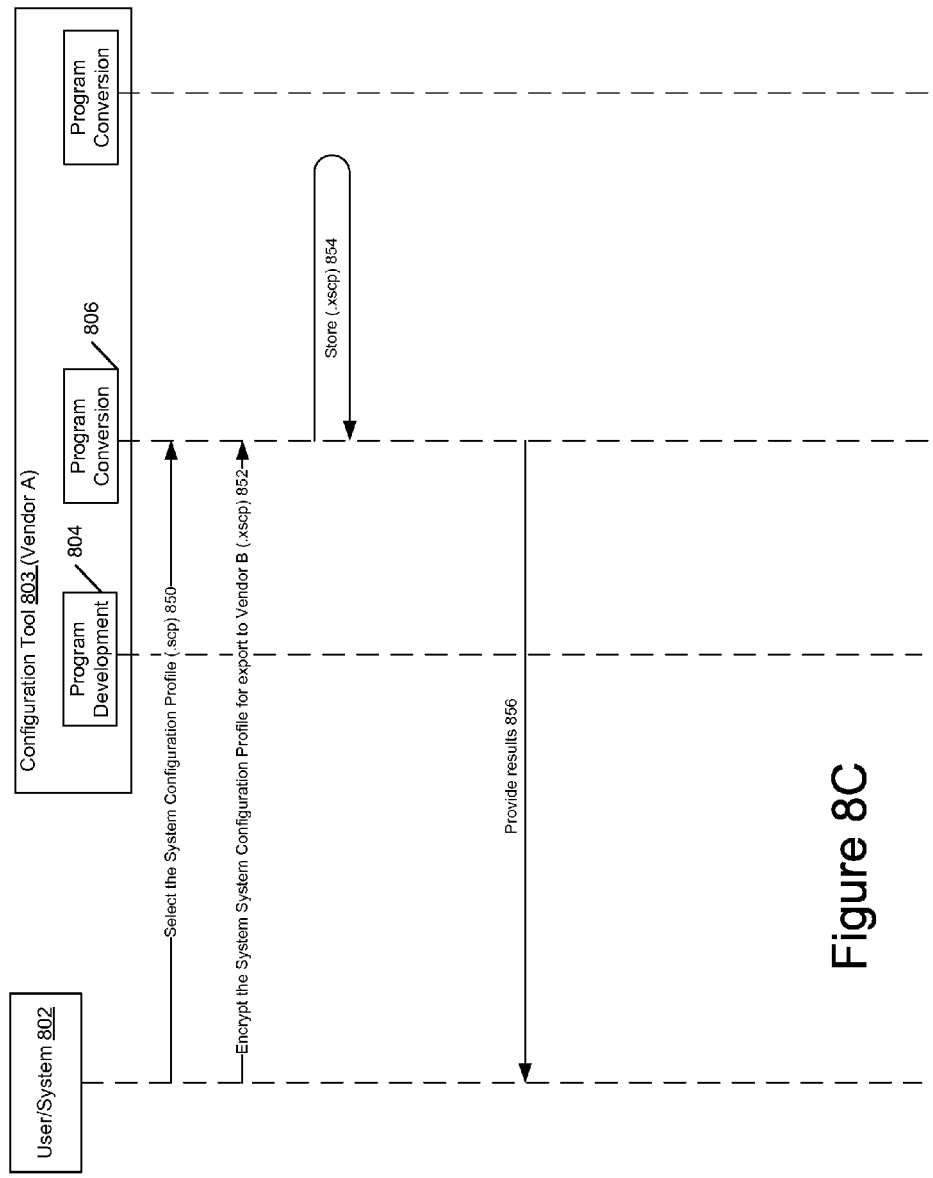

FIGS. 8A, 8B, and 8C comprise a sequence diagram illustrating one embodiment of a method for developing a program for an end device (e.g., by a configuration tool 803). In one embodiment, the configuration tool 803 may be an application running on the AMI system. The end-device program development operation may be comprised of multiple tasks that may be performed at various times. For example, configuration tool 803 may perform a program development operation 804, a program conversion operation 806, and a program conversion 808.

For example, the task shown in FIG. 8A may produce a generic profile definition of a configurable end-device component. Exemplary configurable components comprise TOU, demand, interval data, power quality measurement, display, and/or outage/restoration components. At 810, a user/system 802 (e.g., program developer) may select a program component type. Based on the program component type, a configuration tool 803 may provide a form for component type input parameters (e.g., configuration parameters) at 812. At 814, the user/system 802 may input desired program (configuration) parameters for the selected component type. At 814, the program may not be specific to a particular end-device (e.g., model and/or make). At 816, a generic XML program component may be created. The generic program component may be stored at 818. At 820, the generic program component may be provided with a unique identifier that, for example, may be used to synchronize the component across multiple systems and/or used to group together the same program across different device-specific transformations according to various end-devices (e.g., different models and/or makes) as shown in FIG. 8B.

The exemplary sequence shown in FIG. 8A may continue with the exemplary sequence shown in FIG. 8B, wherein a user/system 802 may select one or more of the generic components at 822. At 824, a specific target device may be identified. The identified target device may correspond to a particular end-device model, family, type, and/or style. Each different end device that may be programmed may be identified at 824. The generic configuration profiles may be converted into programming operations corresponding to a selected end device. A device specific conversion may be initiated at 826. At 828, an unencrypted program recipe may be created with or without default values. At 830, a program recipe body may be created and comprised of an ordered list of C12 tables and/or functions. The program recipe may comprise the particular end device sequence of operations that specify "how" to conduct reprogramming of the end device. The program recipe may be supplied with validation and security attributes (e.g., in a program recipe body header) and may be encrypted for secure delivery to the end device. For example, transport verification data (e.g., CRC values) may be provided at 832. Replay detection data (e.g., sequence numbers) may be provided at 834. A signature for the configuration tool 803 may be provided at 836. At 838, the program recipe body including a body header may be encrypted, for example, using a Vendor A encryption algorithm and seed (e.g., AES). A meta-data block may be constructed at 840. The meta-data may define "what" is being programmed and the meta-data may be consumed by an AMI head-end system. For example, program meta-data may specify the component type, program name, program description, criteria identifying which model/make of devices are applicable to configure using the program recipe, and/or other attributes as shown described herein. At 842, the program recipe header and the encrypted program recipe body including the body header may be concatenated to the meta-data block, for example, producing a program package (e.g., configuration profile). An XML system configuration profile may be constructed at 844 and stored at 846. Results may be provided at 848.

The sequence may continue to FIG. 8C. FIG. 8C shows an example sequence for securing the program package created at 844. For example, the program meta-data may be encrypted using an encryption method specific to a targeted AMI system. For example, a program package created in FIG. 8B may be provided to different AMI networks and/or systems, and various AMI systems may implement specific encryption methods based on the vendor of the AMI system (e.g., Vendor B). At 850, a system configuration profile may be selected from the configuration tool 803. The system configuration profile may be encrypted using a public key cryptography algorithm of the developer (e.g., Vendor B) of the AMI network at 852. For example, the Vendor B encrypted system configuration profile may be stored at 854 and provided to a user/system 802 at 856.

FIGS. 9A, 9B, 9C, and 9D illustrate an embodiment of a sequence for the programming of exemplary fixed-network AMI end-devices 910 from Vendor A through Vendor B's AMI network. For example, the manufacturer of the AMI end-device 910 (e.g., Vendor A) may be different than the developer of the AMI network and AMI head-end (e.g., Vendor B).

Referring to FIG. 9A, a configuration profile may be imported and created. A user or system 902 may import a program package (e.g., created by the configuration tool 803) into the AMI head-end 904 (via an AMI network) at 912. The system configuration profile may be decrypted at 916. A new AMI head-end network configuration profile (CP) may be created at 918 and stored at 920. Time may pass before the new CP is used to program an end-device 910 through the AMI network.

Referring to FIG. 9B, when it is time to configure the end device(s) 908, at 922, the user/system 902 may retrieve a list of appropriate end device corresponding to a configuration profile. The list of devices appropriate to a configuration profile may be received at 924 and a user/system 902 may use program meta-data as criteria to guide the selection of appropriate end-devices at 926. At 928, configuration parameters may be overridden in the program recipe header. The configuration profile job may specify a transport mode of immediate and/or scheduled at 930. If a scheduled transport is specified, the user/system 902 may include the date and/or time for scheduled execution. The AMI transportation job may be submitted at 932 with a transport mode. At 934, the AMI head-end may change a job status, for example, to indicate that a WAN transport is pending. Operation results may be returned to a user/system 902 at 936.

Referring to FIG. 9C, a transport of the configuration profile may begin at the time specified based on the transport mode selected at 930. After the transport is activated at 938, the end device(s) 910 may be validated for the specified CP at 940. The CP may be retrieved from a database at 942. The AMI head-end 904 may construct operations for various AMI collectors 906 based upon the current network topology and the list of devices specified at 926. For each AMI collector 906 operation, the AMI head-end 904 may package the CP for transport through the AMI network (e.g., WAN and/or LAN) at 944. For example, an AMI transport package may comprise AMI collector operations, end device NIC operations, specific AMI network commands, and/or the program recipe for the end device(s) 910. The AMI head-end 904 may establish secure sessions (946) with each participating AMI collector 906 and may perform the WAN transport of the program package to the AMI collectors 906 in parallel at 948. At 950, the head-end 904 may update a CP state to "LAN transport pending" for each end device 910. At 952, the AMI collector (s) 906 may be polled for completion notification and/or notification of enablement.

Figure 9D:
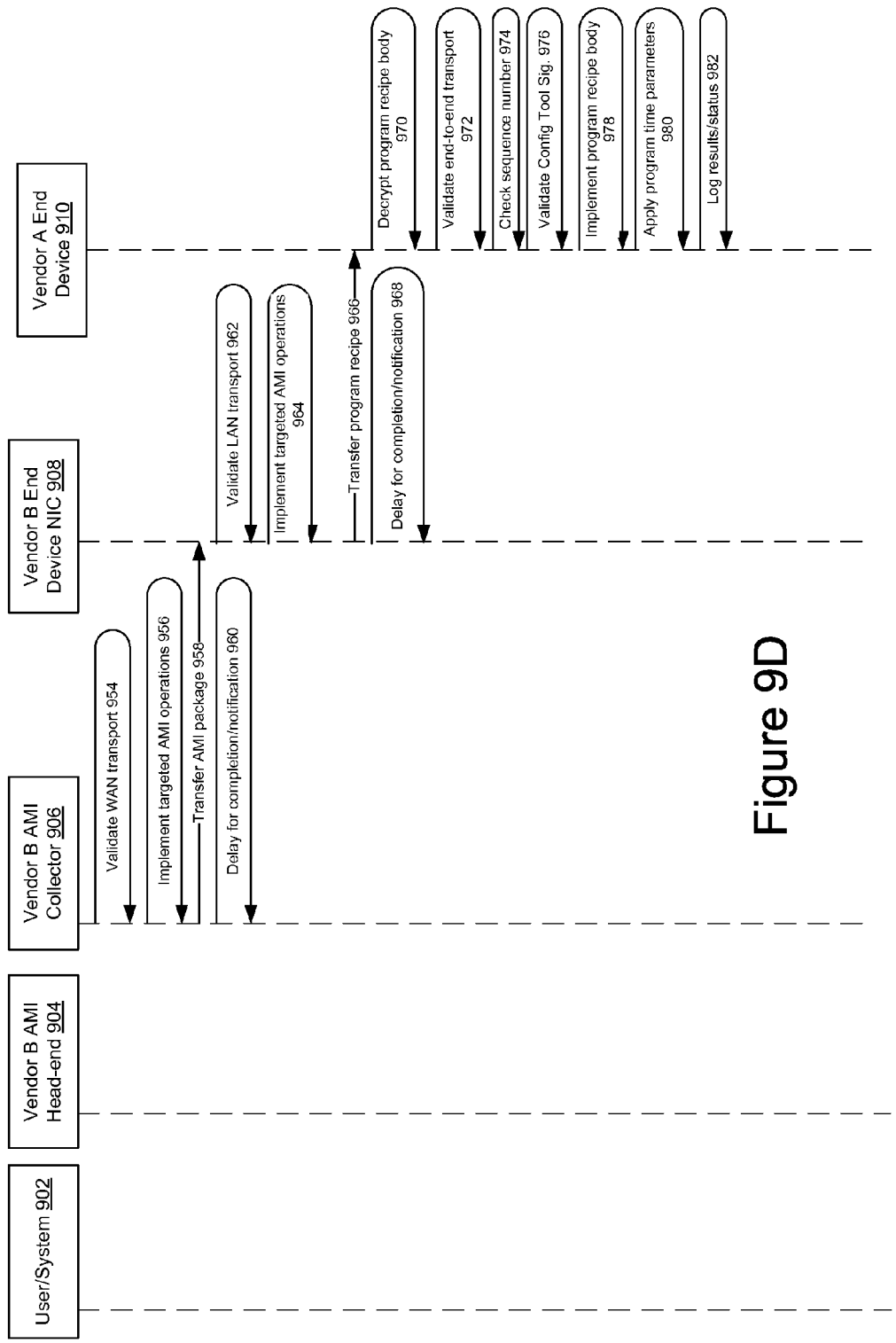
Figure 9E:
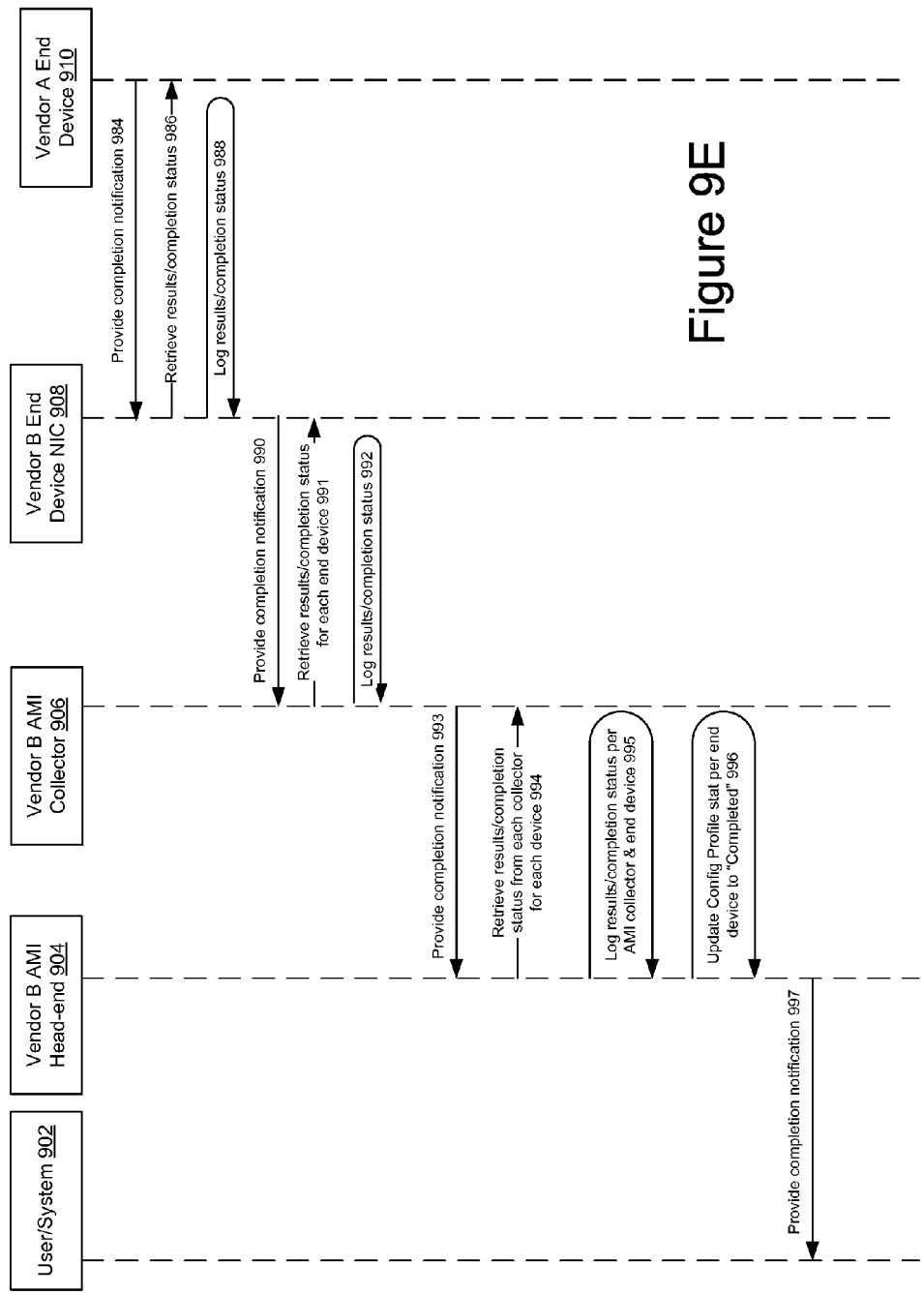

Referring to FIGS. 9D and 9E, an example sequence is shown for transferring the program recipe to the end device(s) 910. The transfer of the program recipe may be performed independently by each AMI collector 906. Each AMI collector 906 may validate the WAN transport of data at 954. At 956, each collector 906 may execute any specific commands that are applicable to the collector (e.g., targeted AMI operations). At 958, the collector 906 may transfer additional AMI network commands and the program recipe (e.g., the AMI package) to each AMI end device NIC 908 specified in its list. At 960, the collectors 906 may delay for end device NIC 908 completion or notification. Each AMI end device NIC 908 may validate LAN transport of data at 962, execute any specific commands corresponding to it at 964, and transfer the program recipe to the generic program table in the end device 910 at 966. At 968, the end device NIC 908 may delay for a completion message or notification from the end device 910. The end-device 910 may decrypt the encrypted program recipe body using a Vendor A encryption algorithm (970), validate end-to-end transport (972), and perform security checks such as checking the sequence number for replay protection (974) and validating the signature of the configuration tool (976). At 978, the end device 910 may implement the specified sequence of table and function operations specified by the program recipe body (978) and/or may override parameters using the parameter values provided in the program recipe header (980). The program recipe header may comprise a sequence of table write, table read, and/or function execution operations that may be performed on standard C12.19 and/or manufacturer tables and/or functions. At 982, the end device 910 may log the results and/or the status of the program recipe implementation.

Referring to FIG. 9E, the end device 910 may provide a notification to the end device NIC 908 when the implementation is complete (984). The NIC 908 may retrieve the results and/or completion status at 986 and log the results and/or status at 988. The end device NIC 908 may provide a notification to the collector(s) 906 when the implementation is complete (990). The collector(s) 906 may retrieve the results and/or completion status at 991 (e.g., for each end device 910) and log the results and/or status at 992. The collector(s) 906 may provide a notification to the head-end 904 when the implementation is complete (993). The head-end 904 may retrieve the results and/or completion status at 995 (e.g., from each collector 906 for each device 910) and log the results and/or status at 995. At 996, the head-end 904 may update each configuration profile state associated with each end device 910 to "completed." A notification may be provided to the user/system 902 at 997.

Transferring the program recipe through the AMI network for execution in the end device(s) 910 (e.g., as shown in FIGS. 9A, 9B, 9C, 9D, and 9E) may provide a secure and atomic delivery mechanism. The program recipe may be constructed to utilize operational tables and/or end device pending tables, for example, if they exist in a particular end device. The end device may provide additional functions that may be incorporated into the program recipe for additional validation, auditing, logging, and/or general processing tasks. Extensions to the programming operations or the program recipe may be independent from the AMI System and thus may enable increased functionality without having to change or adapt an AMI network.

FIG. 10 is a block diagram of an exemplary computing system on which, for example, the configuration tool 404 (FIG. 4) may be implemented. Additionally, functionality of the head-end 406 (FIGS. 4 and 6) may be implemented by the computing system 1000 of FIG. 10. Computing system 1000 may be controlled primarily by computer readable instructions, which may be in the form of software, wherever, or by whatever means such software is stored or accessed. Such computer readable instructions may be executed within central processing unit (CPU) 1010 to cause computing system 1000 to do work. In many known workstations and personal computers, central processing unit 1010 is implemented by a single-chip CPU called a microprocessor. In other machines, the central processing unit 1000 may comprise multiple processors. Coprocessor 1015 is an optional processor, distinct from main CPU 1010, and may perform additional functions or assists CPU 1010.

In operation, CPU 1010 may fetch, decode, and execute instructions, and transfer information to and from other resources via the computer's main data-transfer path, system bus 1005. Such a system bus connects the components in computing system 1000 and defines the medium for data exchange. System bus 1005 may include data lines for sending data, address lines for sending addresses, and control lines for sending interrupts and for operating the system bus. An example of such a system bus 1005 is the PCI (Peripheral Component Interconnect) bus.

Memory devices coupled to system bus 1005 may include random access memory (RAM) 1025 and/or read only memory (ROM) 1030. Such memories include circuitry that allows information to be stored and retrieved. ROMs 1030 may generally contain stored data that cannot easily be modified. Data stored in RAM 1025 may be read or changed by CPU 1010 or other hardware devices. Access to RAM 1025 and/or ROM 1030 may be controlled by memory controller 1020. Memory controller 1020 may provide an address translation function that translates virtual addresses into physical addresses as instructions are executed. Memory controller 1020 may also provide a memory protection function that isolates processes within the system and isolates system processes from user processes. Thus, a program running in a first mode may access memory mapped by its own process virtual address space; it may not access memory within another process's virtual address space unless memory sharing between the processes has been set up.

In addition, computing system 1000 may contain peripherals controller 1035 which may be responsible for communicating instructions from CPU 1010 to peripherals, such as, printer 1040, keyboard 1045, mouse 1050, and disk drive 1055.

Display 1065, which may be controlled by display controller 1063, is used to display visual output generated by computing system 1000. Such visual output may include text, graphics, animated graphics, and video. Display 1065 may be implemented with a CRT-based video display, an LCD-based flat-panel display, gas plasma-based flat-panel display, or a touch-panel. Display controller 1063 may include electronic components used to generate a video signal that is sent to display 1065.

Further, computing system 1000 may contain network adaptor 1070 that may be used to connect computing system 1000 to an external communications network 1060, such as an AMI network. Communications network 1060 may provide computer users with means of communicating and transferring information electronically. Communications network 1060 also may include but is not necessarily limited to fixed-wire local area networks (LANs), wireless LANs, fixed wire wide-area-networks (WANs), wireless WANs, fixed wire extranets, wireless extranets, fixed-wire intranets, wireless intranets, fixed wire and wireless peer-to-peer networks, fixed wire and wireless virtual private networks, the Internet, and the wireless Internet. Additionally, communications network 1060 may provide distributed processing, which involves several computers and the sharing of workloads or cooperative efforts in performing a task. It will be appreciated that the network connections shown are exemplary and that other means of establishing a communications link between the computers may be used.

All or portions of the methods and apparatus described above may be embodied in hardware, software, or a combination of both. When embodied in software, the methods and apparatus of the present invention, or certain aspects or portions thereof, may be embodied in the form of program code (e.g., computer-executable instructions or processor-executable instructions). This program code may be stored on a computer-readable medium or a processor-readable medium, such as a magnetic, electrical, or optical storage medium, including without limitation, a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A device on which the program code executes, such as a computer, a server, a meter and/or a collector will generally include a processor, a storage medium readable by the processor (including volatile and non-volatile memory and/or storage elements), at least one input device, and at least one output device. The program code may be implemented in a high level procedural or object oriented programming language. Alternatively, the program code may be implemented in an assembly or machine language. In any case, the language may be a compiled or interpreted language. When implemented on a general-purpose processor, the program code may combine with the processor to provide a unique apparatus that operates analogously to specific logic circuits.

While systems and methods have been described and illustrated with reference to specific embodiments, those skilled in the art will recognize that modifications and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network. Also, while the exemplary metering system described above is a fixed network, the present invention can also be employed in mobile (walk by/drive by) systems. Accordingly, reference should be made to the following claims as describing the scope of the present invention.

What is claimed:

1. A method of configuring an end device via an advanced metering infrastructure (AMI) network, the method comprising:

receiving, via the AMI network, a program recipe comprising one or more configuration parameters, the program recipe being specific to the end device and formatted according to a generic program table of the end device;

decrypting and validating the program recipe;

after the decryption and validation of the program recipe, implementing the program recipe, by the end device, to configure the end device with the one or more configuration parameters; and logging a result of the program recipe implementation such that the result can be retrieved by a collector within the AMI network, wherein the end device is associated with a first vendor and the AMI network and the collector are associated with a second vendor that is different than the first vendor, and wherein the program recipe can be decrypted by the end device but it is not able to be decrypted by the AMI network of the second vendor.

2. The method of claim 1, the method further comprising:
receiving, via the AMI network, a system configuration profile comprising a meta-data section and the program recipe comprising a program recipe body, wherein data in the meta-data section is accessed by the AMI network and the program recipe body is accessed by the end device and received via the AMI network without being accessed by the AMI network.

3. The method of claim 2, wherein the program recipe comprises an unencrypted program recipe header comprising one or more site specific parameters or one or more programming time parameters, and wherein at least one of the site specific parameters or programming time parameters is adjusted by the AMI network.

4. The method of claim 3, wherein the one or more programming time parameters comprise an activation time, an expiration time, a sequence number, or a tracking number.

5. The method of claim 3, wherein the one or more site specific parameters comprise one or more transformer constants.

6. The method of claim 2, wherein the system configuration profile is implemented in an XML format.

7. The method of claim 1, the method further comprising:
writing, by a network interface card of the end device, one or more encrypted components of the program recipe into the generic program table of the end device, wherein the network interface card is associated with the second vendor; and
decrypting and validating the one or more encrypted components of the program recipe.

8. The method of claim 1, the method further comprising:
writing one or more encrypted components of the program recipe into the generic program table of the end device;
decrypting and validating the one or more encrypted components of the program recipe;
verifying a sequence number in a body header of the program recipe to prevent a replay attack;
determining whether a hardware version in the body header of the program recipe is at least equal to a hardware version minimum; and
determining whether a firmware version in the body header of the program recipe is at least equal to a firmware version minimum.

9. An end device, the end device comprising:
a transceiver configured to receive, via an advanced metering infrastructure (AMI) network, a program recipe comprising one or more configuration parameters, the program recipe being specific to the end device and formatted according to a generic program table of the end device;
a memory configured to store the generic program table comprising one or more encrypted components of the program recipe; and
a processor configured to:

decrypt the program recipe;
validate the program recipe;
implement the program recipe for configuring the end device with the one or more configuration parameters after the program recipe is decrypted and validated; and
log a result of the program recipe implementation such that the result can be retrieved by a collector within the AMI network,
wherein the end device is associated with a first vendor and the AMI network and the collector are associated with a second vendor that is different than the first vendor, and wherein the program recipe can be decrypted by the end device but it is not able to be decrypted by the AMI network of the second vendor.

10. The end device of claim 9, wherein the transceiver is further configured to receive the program recipe via an AMI head-end device in the AMI network, wherein the AMI head-end device is associated with the second vendor.

11. The end device of claim 10, further comprising:
a network interface card associated with the second vendor and configured to:
write the one or more encrypted components of the program recipe into the generic program table of the end device; and
decrypt and validate the one or more encrypted components of the program recipe.

12. The end device of claim 9, wherein the processor is further configured to:
write the one or more encrypted components of the program recipe into the generic program table;
decrypt and validate the one or more encrypted components of the program recipe;
verify a sequence number in a body header of the program recipe to prevent a replay attack;
determine whether a hardware version in the body header of the program recipe is at least equal to a hardware version minimum; and
determine whether a firmware version in the body header of the program recipe is at least equal to a firmware version minimum.

13. The end device of claim 9, wherein the transceiver is further configured to receive, via the AMI network, a system configuration profile comprising a meta-data section and the program recipe comprising a program recipe body, wherein data in the meta-data section is accessed by the AMI network and the program recipe body is accessed by the end device and received via the AMI network without being accessed by the AMI network.

14. The end device of claim 13, the wherein the program recipe comprises an unencrypted program recipe header comprising one or more site specific parameters or one or more programming time parameters, and wherein at least one of the site specific parameters or programming time parameters is adjusted by the AMI network.

15. The end device of claim 14, wherein the one or more programming time parameters comprise an activation time, an expiration time, a sequence number, or a tracking number.

16. The method of claim 14, wherein the one or more site specific parameters comprise one or more transformer constants.

17. The end device of claim 13, wherein the system configuration profile is implemented in an XML format.

18. A method of remotely configuring an end device, the method comprising:
receiving, by an advanced metering infrastructure (AMI) head-end system via an AMI network, a system configuration profile, the system configuration profile comprising meta-data and a program recipe, wherein the program recipe comprises one or more configuration parameters for programming the end device;

authenticating, by the AMI head-end system, the system configuration profile;

decrypting, by the AMI head-end system, the meta-data without accessing the program recipe;

based on the meta-data, determining, by the AMI head-end system, whether the end device is compatible with the system configuration profile;

retrieving a result indicative of an implementation of the program recipe; and updating a configuration profile state associated with the end device in accordance with the result, wherein the end device is associated with a first vendor and the AMI head-end system is associated with a second vendor that is different than the first vendor, and wherein the program recipe can be decrypted by the end device but it is not able to be decrypted by the AMI head-end system of the second vendor.

19. The method of claim 18, wherein the program recipe comprises an unencrypted program recipe header comprising one or more site specific parameters or one or more programming time parameters, the method further comprising:

changing, by the AMI head-end system, at least one of the site specific parameters or programming time parameters.

* * * * *